United States Patent
Sasaki et al.

(10) Patent No.: US 8,652,731 B2
(45) Date of Patent: Feb. 18, 2014

(54) ELECTROSTATIC IMAGE DEVELOPING TONER, ELECTROSTATIC IMAGE DEVELOPER, TONER CARTRIDGE, PROCESS CARTRIDGE, IMAGE FORMING APPARATUS AND IMAGE FORMING METHOD

(71) Applicant: Fuji Xerox Co., Ltd., Tokyo (JP)

(72) Inventors: Yuki Sasaki, Kanagawa (JP); Sumiaki Yamasaki, Kanagawa (JP); Satoshi Hiraoka, Kanagawa (JP); Susumu Yoshino, Kanagawa (JP); Hirotaka Matsuoka, Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 0 days.

(21) Appl. No.: 13/626,502

(22) Filed: Sep. 25, 2012

(65) Prior Publication Data
US 2013/0022905 A1      Jan. 24, 2013

Related U.S. Application Data

(63) Continuation-in-part of application No. 13/296,494, filed on Nov. 15, 2011.

(30) Foreign Application Priority Data

Apr. 15, 2011   (JP) ................................ 2011-091570
Apr. 13, 2012   (JP) ................................ 2012-092447

(51) Int. Cl.
  *G03G 9/087*      (2006.01)
(52) U.S. Cl.
  USPC .................... 430/109.4; 430/123.5; 528/176; 399/252

(58) Field of Classification Search
  USPC .............. 430/109.4, 123.5; 528/176; 399/252
  See application file for complete search history.

(56) References Cited

U.S. PATENT DOCUMENTS

2003/0203301 A1   10/2003   Iga
2009/0156784 A1*   6/2009   Kubo et al. .................... 530/211

FOREIGN PATENT DOCUMENTS

| JP | 2006-292820 | * 10/2006 | ............. G03G 9/087 |
|---|---|---|---|
| JP | A-2006-292820 | 10/2006 | |
| JP | A-2007-137910 | 6/2007 | |
| JP | A-2010-20170 | 1/2010 | |
| JP | A-2010-117575 | 5/2010 | |
| JP | B2-4505738 | 7/2010 | |

OTHER PUBLICATIONS

Translation of JP 2006-292820 published Oct. 2006.*
Jul. 2, 2012 Extended European Search Report issued in European Application No. 11 19 0248.2.
U.S. Appl. No. 13/296,494 in the name of Yamasaki et al, filed Nov. 15, 2011.

* cited by examiner

*Primary Examiner* — Peter Vajda
(74) *Attorney, Agent, or Firm* — Oliff PLC

(57) ABSTRACT

An electrostatic image developing toner includes (A) an amorphous polyester resin containing at least a repeating unit derived from a dicarboxylic acid component and a repeating unit derived from a dialcohol component represented by the specific formula, and (B) an amorphous polyester resin differing in the weight average molecular weight from the amorphous polyester resin (A), wherein the difference (absolute value) in the weight average molecular weight between the amorphous polyester resin (A) and the amorphous polyester resin (B) is from about 30,000 to about 100,000.

9 Claims, 3 Drawing Sheets

ELECTROSTATIC IMAGE DEVELOPING TONER, ELECTROSTATIC IMAGE DEVELOPER, TONER CARTRIDGE, PROCESS CARTRIDGE, IMAGE FORMING APPARATUS AND IMAGE FORMING METHOD

CROSS-REFERENCE TO RELATED APPLICATIONS

This is a Continuation-In-Part application of U.S. application Ser. No. 13/296,494 filed in the United States on Nov. 15, 2011; the entire content of which is hereby incorporated by reference.

Further, this application is based on and claims priority under 35 USC 119 from Japanese Patent Application No. 2012-92447 filed on Apr. 13, 2012.

BACKGROUND

1. Field

The present invention relates to an electrostatic image developing toner, an electrostatic image developer, a toner cartridge, a process cartridge, an image forming apparatus, and an image forming method.

2. Description of the Related Art

A method for visualizing image information through a step of forming and developing an electrostatic latent image, such as electrophotography, is being utilized in various fields at present. Formation of an image by this method is performed by electrically charging the entire surface of a photoconductor (latent image holding member), exposing the surface of the photoconductor to laser light according to image information to form an electrostatic latent image, developing the electrostatic latent image with a developer including a toner to form a toner image, and finally transferring/fixing the toner image to the surface of a recording medium.

As the toner applied to the above-described electrophotography, the followings are known.

For example, JP-A-2010-117575 (the term "JP-A" as used herein means an "unexamined published Japanese patent application") discloses a toner in which the binder resin contains (A) a polyester resin obtained by condensation polymerization of an alcohol component containing an aliphatic polyhydric alcohol with a carboxylic acid component containing a (meth)acrylic acid-modified rosin and (B) a polyester resin obtained by polycondensation of an alcohol component containing an alkylene oxide adduct of specific bisphenol A with a carboxylic acid component.

Also, Japanese Patent 4505738 discloses a toner in which a reaction product (P) of a rosin (R) and an epoxy group-containing compound (E) is used in combination with a binder resin (Q).

Furthermore, in JP-A-2010-20170, a toner containing a polyester resin in which the acid component is composed of (1) an aromatic dicarboxylic acid and (2) a disproportionated rosin, the alcohol component is composed of (3) a trivalent or higher valent polyhydric alcohol, the molar ratio (3)/(1) is from 1.05 to 1.65, and the molar ratio (2)/(1) is from 0.40 to 2.60, is known.

SUMMARY

The object above can be attained by the following techniques.

<1> An electrostatic image developing toner including:

(A) an amorphous polyester resin containing at least a repeating unit derived from a dicarboxylic acid component and a repeating unit derived from a dialcohol component represented by the following formula (1), and (B) an amorphous polyester resin differing in the weight average molecular weight from the amorphous polyester resin (A), wherein the difference (absolute value) in the weight average molecular weight between the amorphous polyester resin (A) and the amorphous polyester resin (B) is from about 30,000 to about 100,000:

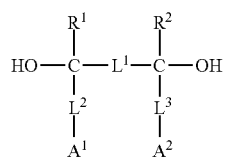

(1)

wherein each of $R^1$ and $R^2$ independently represents hydrogen or a methyl group, each of $L^1$, $L^2$ and $L^3$ independently represents a divalent linking group selected from the group consisting of a carbonyl group, an ester group, an ether group, a sulfonyl group, a chain alkylene group which may have a substituent, a cyclic alkylene group which may have a substituent, an arylene group which may have a substituent, and a combination thereof, $L^1$ and $L^2$, or $L^1$ and $L^3$ may form a ring, and each of $A^1$ and $A^2$ represents a rosin ester group.

BRIEF DESCRIPTION OF THE DRAWINGS

Exemplary embodiments of the present invention will be described in detail based on the following figures, wherein.

DETAILED DESCRIPTION OF EXEMPLARY EMBODIMENTS

Figure 1:
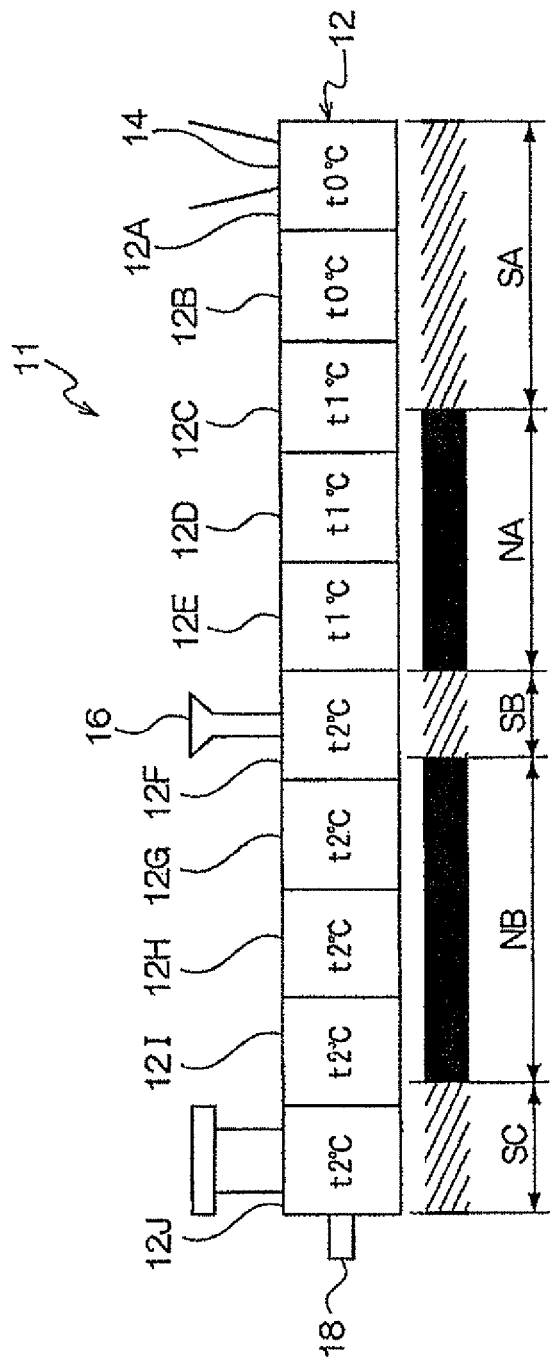
FIG. 1 is a view for explaining the state of a screw in one example of the screw extruder used for the production of the toner according to the present exemplary embodiment.

The exemplary embodiment as an example of the present invention is described in detail below.

<Electrostatic Image Developing Toner>

The electrostatic image developing toner (hereinafter, referred to as "toner") according to the present exemplary embodiment is configured to contain (A) an amorphous polyester resin (hereinafter, referred to as "polyester resin (A)") and (B) an amorphous polyester resin (hereinafter, referred to as "polyester resin (B)") differing in the weight average molecular weight from the polyester resin (A).

The polyester resin (A) is a polyester resin containing at least a repeating unit derived from a dicarboxylic acid component and a repeating unit derived from a dialcohol component represented by formula (1).

The difference (absolute value) in the weight average molecular weight between the polyester resin (A) and the polyester resin (B) is from 30,000 to 100,000 or from about 30,000 to about 100,000.

Thanks to these configurations, the toner according to the present exemplary embodiment becomes a toner excellent in phase dissolution. Because the toner has excellent phase dissolution, uniformity of image gloss at high-speed low-temperature fixing or low-pressure fixing is realized.

The reasons therefor are not clearly known but are presumed as follows.

The rosin is a molecule having high hydrophobicity and a large volume/molecular weight. That is, the dialcohol component represented by formula (1) is considered to impart a bulky rosin structure to the side chain of the polyester resin. The polyester resin (A) containing a rosin structure in the side chain is considered to readily allow for intrusion of other resins into the inside of the structure and be excellent in compatibility with other resins.

Specifically, as represented by formula (1), the polyester resin (A) containing a rosin structure in the side chain contains a rosin structure in a repeating unit derived from an alcohol component. This means that the polyester resin is synthesized using a polyhydric alcohol containing a rosin structure, and it is presumed that because such a rosin structure-containing dialcohol differs in the resin form from a polyvalent carboxylic acid (acid component) containing a rosin structure in the straight chain and becomes bulky and rich in compatibility between resins, reduction in viscosity at low temperature rapidly proceeds.

For this reason, low-temperature fixing property of the toner is considered to be realized.

Together with the polyester resin (A) having such properties, when the polyester resin (B) having a molecular weight difference in the range above is used in combination, compatibility between respective resins is more enhanced also under high-speed low-temperature fixing conditions or in the fixing by an electromagnetic induction heating system or the fixing under low pressure, typified by optical fixing, and moreover, uniform gloss is imparted to the image. It is generally known to use a plurality of resins having a wide molecular weight distribution or resins having a molecular weight difference so as to enhance preservability of the fixed image, and in the case of using a resin having the above-described properties, thanks to good compatibility between the low molecular weight moiety and the high molecular weight moiety, their compatibilization is considered to be rapidly obtained even under low temperature condition or low pressure condition, leading to imparting uniform glossiness.

For these reasons, the toner according to the present exemplary embodiment is considered to become a toner excellent in phase dissolution owing to the configurations above. Because the toner has excellent phase dissolution, uniformity of image gloss at high-speed low-temperature fixing or low-pressure fixing is expected to be realized.

[Polyester Resin (A)]

The polyester resin (A) is described below.

The polyester resin (A) is a polycondensate containing a repeating unit derived from a dicarboxylic acid component and a repeating unit derived from a dialcohol component represented by formula (1).

The polyester resin (A) is an amorphous resin.

Here, the crystalline resin means a resin having a definite endothermic peak, not a stepwise change of endothermic heat quantity, in the thermal analysis measurement using differential scanning calorimetry (DSC). On the other hand, the amorphous resin means a resin having only a stepwise endothermic change, but not a definite endothermic peak, in the thermal analysis measurement using differential scanning calorimetry (DSC) and indicates a resin that is solid at ordinary temperature (for example, solid at 25° C.) and is thermally plasticized at a temperature more than the glass transition temperature.

Specifically, for example, the crystalline resin means a resin where the half-value width of the endothermic peak measured at a temperature rise rate of 10° C./min is within 10° C., and the amorphous resin means a resin where the half-value width exceeds 10° C., or a resin where a definite endothermic peak is not observed.

(Repeating Unit Derived from Dicarboxylic Acid Component)

The dicarboxylic acid component-derived repeating unit in the polyester resin (A) includes a repeating unit derived from at least one dicarboxylic acid selected from the group consisting of the following aromatic dicarboxylic acids and aliphatic dicarboxylic acids.

Specific examples of the aromatic dicarboxylic acid and aliphatic dicarboxylic acid include an aromatic dicarboxylic acid such as phthalic acid, isophthalic acid, terephthalic acid, 1,4-naphthalenedicarboxylic acid and 2,6-naphthalenedicarboxylic acid; an aliphatic dicarboxylic acid such as oxalic acid, malonic acid, maleic acid, fumaric acid, citraconic acid, itaconic acid, glutaconic acid, succinic acid, adipic acid, sebacic acid, azelaic acid, dimeric acid, alkylsuccinic acid having a branched chain and having a carbon number of 1 to 20, and alkenylsuccinic acid having a branched chain and having an alkenyl group with a carbon number of 1 to 20; and an alkyl (having a carbon number of 1 to 3) ester of such an acid. Among these, in view of durability and fixing property of toner, dispersibility of coloring agent, and easy availability, an aromatic carboxylic acid such as isophthalic acid and terephthalic acid, and an aliphatic carboxylic acid such as succinic acid, sebacic acid and azelaic acid, are preferred.

One of these aromatic carboxylic acids and aliphatic carboxylic acids may be used alone, or two or more thereof may be used in combination. Also, a trivalent or higher valent aromatic carboxylic acid may be used as long as the effects of the present exemplary embodiment are not impaired. Examples of the trivalent or higher valent carboxylic acid include trimellitic acid, pyromellitic acid, naphthalenetricarboxylic acid, benzophenonetetracarboxylic acid, biphenyltetracarboxylic acid, and an anhydride thereof. One of these may be used alone, or two or more thereof may be used in combination. In view of easy availability and reactivity, the trivalent or higher valent aromatic carboxylic acid is preferably trimellitic anhydride.

(Repeating Unit Derived from Dialcohol Component Represented by Formula (I))

The repeating unit derived from a dialcohol component represented by formula (1) in the polyester resin (A) is described below.

First, the dialcohol component represented by the following formula (1) is described.

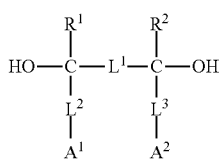
(1)

In formula (1), each of $R^1$ and $R^2$ independently represents hydrogen or a methyl group. Each of $L^1$, $L^2$ and $L^3$ independently represents a divalent linking group selected from the group consisting of a carbonyl group, an ester group, an ether group, a sulfonyl group, a chain alkylene group which may have a substituent, a cyclic alkylene group which may have a substituent, an arylene group which may have a substituent, and a combination thereof, and $L^1$ and $L^2$, or $L^1$ and $L^3$ may form a ring. Each of $A^1$ and $A^2$ represents a rosin ester group.

The rosin ester group as used herein means a moiety after excluding a hydrogen atom from a carboxyl group contained in a rosin.

The chain alkylene group represented by $L^1$, $L^2$ and $L^3$ includes, for example, an alkylene group having a carbon number of 1 to 10.

The cyclic alkylene group represented by $L^1$, $L^2$ and $L^3$ includes, for example, a cyclic alkylene group having a carbon number of 3 to 7.

The arylene group represented by $L^1$, $L^2$ and $L^3$ includes, for example, a phenylene group, a naphthylene group and an anthracene group.

Examples of the substituent which is introduced into the above-described chain alkylene group, cyclic alkylene group and arylene group include an alkyl group having a carbon number of 1 to 8, and an aryl group, and a linear, branched or cyclic alkyl group is preferred. Specific examples thereof include a methyl group, an ethyl group, a propyl group, a butyl group, a pentyl group, a hexyl group, a heptyl group, an octyl group, an isopropyl group, an isobutyl group, an s-butyl group, a tert-butyl group, an isopentyl group, a neopentyl group, a 1-methylbutyl group, an isohexyl group, a 2-ethylhexyl group, a 2-methylhexyl group, a cyclopentyl group, a cyclohexyl group, and a phenyl group.

The compound represented by formula (1) is a dialcohol compound having two rosin ester groups per molecule (hereinafter, sometimes referred to as "specific rosin diol").

A rosin which is a base of the rosin ester group contained in the specific rosin diol has a bulky structure and is highly hydrophobic and therefore, the polyester resin (A) containing the rosin ester group hardly contains water. In addition, the polyester resin (A) has a hydroxyl group or a carboxyl group only at a terminal of the resin molecule in view of its structure, so that the amount of the rosin ester group in the resin can be increased without increasing the amount of a hydroxyl group or a carboxyl group which may adversely affect the electrostatic properties of a toner. Furthermore, in the case of obtaining the specific rosin diol by reacting a rosin and a difunctional epoxy compound, the ring-opening reaction of the epoxy group, which takes place between an epoxy group in the difunctional epoxy compound and a carboxyl group in the rosin, is more reactive than the esterification reaction occurring between the alcohol component and the rosin, and therefore, an unreacted rosin hardly remains in the polyester resin (A).

An example of the synthetic scheme for the polyester resin (A) is shown below. In the following synthetic scheme, a difunctional epoxy compound is reacted with a rosin to synthesize the specific rosin diol, and the specific rosin diol is then subjected to dehydration polycondensation with a dicarboxylic acid, whereby a polycondensate of the polyester resin (A) is synthesized. In the structural formula representing the polyester resin (A), the portion surrounded by the dashed line corresponds to the rosin ester group.

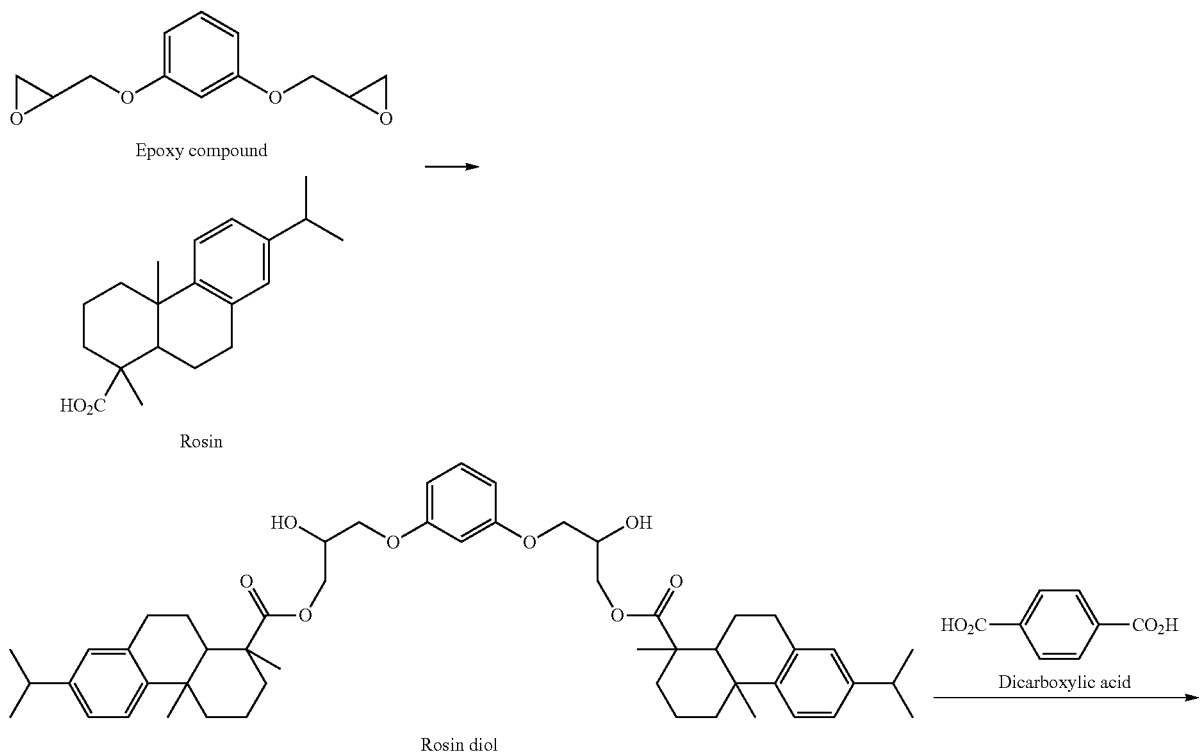

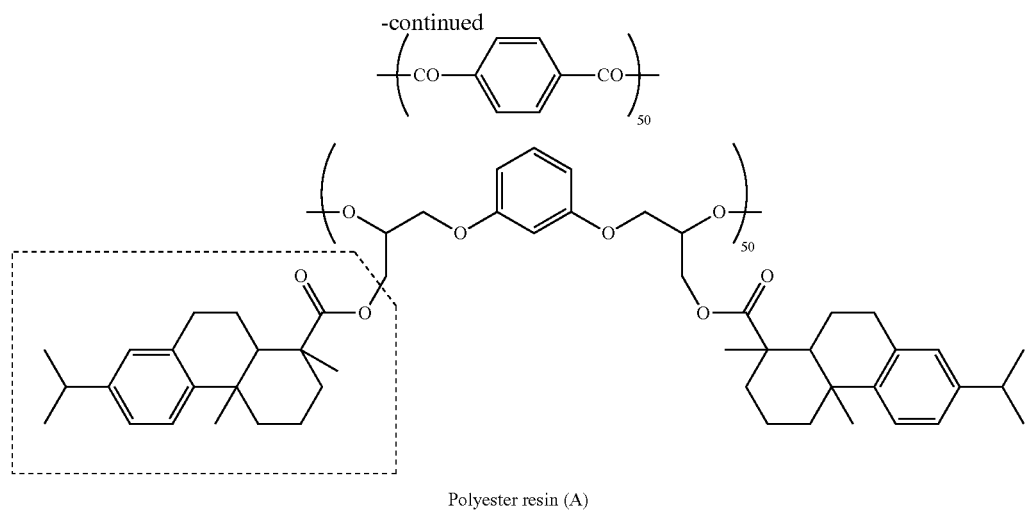

Polyester resin (A)

Incidentally, the polycondensate of the polyester resin (A) is, when hydrolyzed, decomposed into the following monomers. This polyester resin (A) is a condensate of a dicarboxylic acid and a diol in a ratio of 1:1 and therefore, the constituent components of the resin can be estimated from the decomposition product.

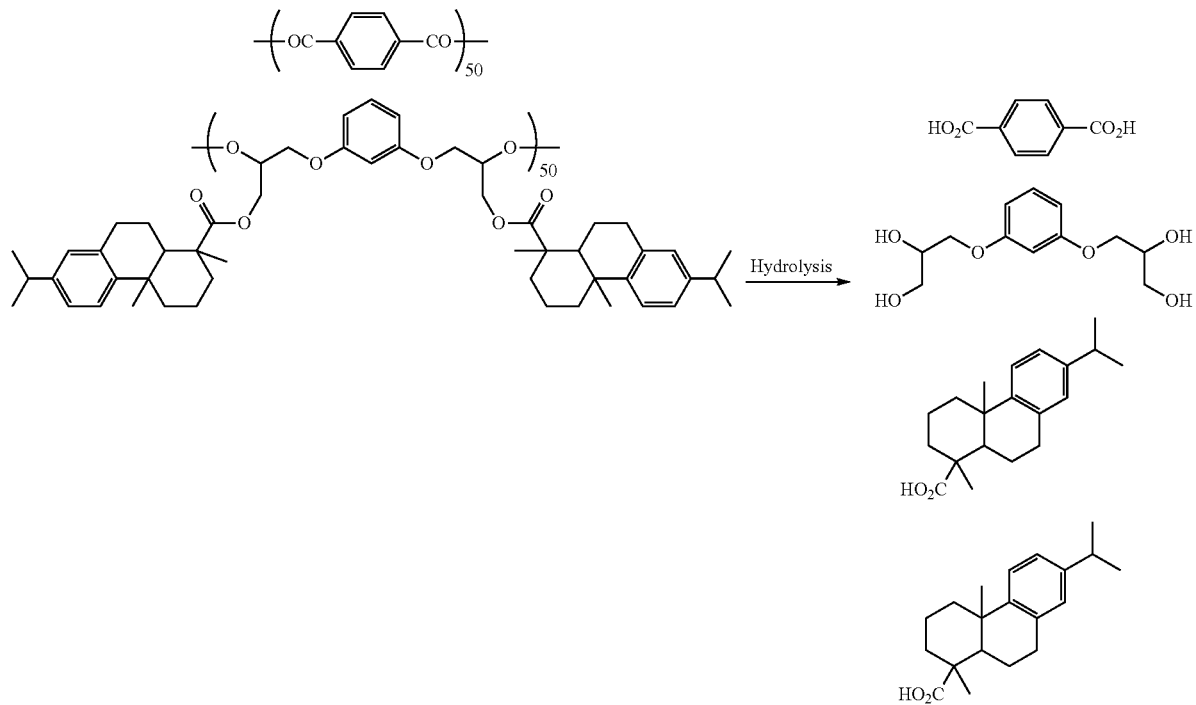

The synthesis method for the specific rosin diol represented by formula (1) is specifically described below.

The specific rosin diol represented by formula (1) is synthesized by a known method, for example, by a reaction of an epoxy compound and a rosin.

The epoxy compound which can be used in the present exemplary embodiment is a difunctional epoxy compound having two epoxy groups per molecule, and examples thereof include a diglycidyl ether of an aromatic diol, a diglycidyl ether of an aromatic dicarboxylic acid, a diglycidyl ether of an aliphatic diol, a diglycidyl ether of an alicyclic diol, and an alicyclic epoxide.

In this way, the specific rosin diol is synthesized using a polyfunctional epoxy compound, and therefore, for example, the polyester resin (A) containing a repeating unit derived from such a specific rosin diol gives a toner more excellent in the electrostatic properties. This is attributable to the fact that the reactivity of the epoxy compound is higher than the reactivity of the general-purpose other functional alcohols and therefore, a carboxylic acid with low reactivity contained in a rosin can be efficiently reacted. As a result, a reverse reaction or a side reaction is also suppressed.

Representative examples of the diglycidyl ether of an aromatic diol include, in terms of the aromatic diol component, bisphenol A, derivatives of bisphenol A, such as polyalkylene oxide adduct of bisphenol A, bisphenol F, derivatives of bisphenol F, such as polyalkylene oxide adduct of bisphenol F, bisphenol S, derivatives of bisphenol S, such as polyalkylene oxide adduct of bisphenol S, resorcinol, tert-butylcatechol, and biphenol.

Representative examples of the diglycidyl ether of an aromatic dicarboxylic acid include, in terms of the aromatic dicarboxylic acid component, terephthalic acid, isophthalic acid, and a phthalic acid.

Representative examples of the diglycidyl ether of an aliphatic diol include, in terms of the aliphatic diol component, ethylene glycol, 1,2-propanediol, 1,3-propanediol, 1,4-butanediol, 1,5-pentanediol, 1,6-hexanediol, neopentyl glycol, 1,9-nonanediol, diethylene glycol, triethylene glycol, polyethylene glycol, polypropylene glycol, and polytetramethylene glycol.

Representative examples of the diglycidyl ether of an alicyclic diol include, in terms of the alicyclic diol component, hydrogenated bisphenol A, derivatives of hydrogenated bisphenol A, such as polyalkylene oxide adduct of hydrogenated bisphenol A, and cyclohexanedimethanol.

Representative examples of the alicyclic epoxide include limonene dioxide.

The epoxy group-containing compound is obtained, for example, by reacting a diol component and an epihalohydrin and depending on the ratio of amounts, may be polycondensed to have a higher molecular weight.

The reaction of a rosin with a difunctional epoxy compound proceeds mainly by a ring-opening reaction of a carboxyl group of the rosin and an epoxy group of the difunctional epoxy compound. At this time, the reaction temperature is preferably a temperature not lower than the melting temperatures of two constituent components and/or a temperature enabling uniform mixing and specifically, the reaction temperature is generally from 60 to 200° C. At the reaction, a catalyst for accelerating the ring-opening reaction of the epoxy group may be added.

Examples of the catalyst include amines such as ethylenediamine, trimethylamine and 2-methylimidazole; quaternary ammonium salts such as triethylammonium bromide, triethylammonium chloride and butyltrimethylammonium chloride, and triphenylphosphine.

The reaction is performed by various methods, for example, in the case of a batch system, generally by charging a rosin and a difunctional epoxy compound in a predetermined ratio into a heatable flask equipped with a condenser, a stirrer, an inert gas inlet, a thermometer and the like, heat-melting the mixture, and appropriately sampling the reaction product to trace the reaction. The progress of the reaction is confirmed mainly by the reduction in acidity and, for example, the reaction is appropriately completed when reaching at or near the stoichiometric reaction endpoint.

As for the ratio of a rosin and a difunctional epoxy compound reacted, the rosin is preferably reacted in a range of 1.5 mol to 2.5 mol per mol of the difunctional epoxy compound, and the rosin is more preferably reacted in a range of 1.8 mol to 2.2 mol, still more preferably in a range of 1.85 mol to 2.1 mol, per mol of the difunctional epoxy compound. If the ratio of the rosin reacted is less than 1.5 mol, the epoxy group in the difunctional epoxy compound remains in the subsequent polyester production step and may bring about an abrupt increase in the molecular weight by the action as a crosslinking agent and cause gelling. On the other hand, if the ratio of the resin reacted exceeds 2.5 mol, an unreacted rosin remains and may cause deterioration of the electrostatic properties due to increase in the acid value.

The rosin in the specific rosin diol represented by formula (1) is described below.

The rosin is a generic name for resin acids obtained from trees and is a naturally occurring substance containing, as major components, an abietic acid that is a kind of tricyclic diterpenes, and an isomer thereof. Specific examples of the component include, in addition to the abietic acid, a palustric acid, a neoabietic acid, a pimaric acid, a dehydroabietic acid, isopimaric acid, and a sandaracopimaric acid. The rosin used in the present exemplary embodiment is a mixture of these acids. Rosins are roughly classified by the collection method into three kinds, that is, a tall rosin produced from a pulp, a gum rosin produced from a pine tree, and a wood rosin produced from a pine tree stump. The rosin is preferably at least either one of a gum rosin and a tall rosin, because these are easily available.

These rosins are preferably purified. For example, a high molecular weight substance that is thought to be derived from a peroxide of a resin acid, and a non-saponified substance contained in unpurified rosins are removed from unpurified rosins, whereby a purified rosin is obtained. The purification method is not particularly limited and may be selected from various know purification methods. Specific examples thereof include distillation, recrystallization, and extraction. From the industrial standpoint, purification is preferably performed by distillation. The distillation is usually selected taking into consideration the distillation time at a temperature of 200° C. to 300° C. and a pressure of 6.67 kPa or less. Recrystallization is performed, for example, by dissolving an unpurified rosin in a good solvent, subsequently removing the solvent to make a concentrated solution, and adding a poor solvent to the solution. Examples of the good solvent include aromatic hydrocarbons such as benzene, toluene and xylene, chlorinated hydrocarbons such as chloroform, alcohols such as lower alcohol, ketones such as acetone, and acetic acid esters such as ethyl acetate. The poor solvent includes a hydrocarbon-based solvent such as n-hexane, n-heptane, cyclohexane and isooctane. Extraction is, for example, a method where an aqueous alkali solution of an unpurified rosin is formed using an alkali water and after extracting an insoluble non-saponified substance contained therein by using an organic solvent, the aqueous layer is neutralized to obtain a purified rosin.

The rosin may be a disproportionated rosin. The disproportionated rosin is obtained by heating a rosin containing an abietic acid as a major component at a high temperature in the presence of a disproportionation catalyst to eliminate an unstable conjugated double bond in the molecule and is a mixture of, as major components, a dehydroabietic acid and a dihydroabietic acid.

The disproportionation catalyst includes various known compounds, for example, a supported catalyst such as palladium carbon, rhodium carbon and platinum carbon, a metal powder such as nickel and platinum, an iodide such as iron iodide, and a phosphorus-based compound. Usually, the amount of the catalyst used is preferably from 0.01 mass % to 5 mass %, more preferably from 0.01 mass % to 1 mass %, based on the rosin, and the reaction temperature is preferably from 100° C. to 300° C., more preferably from 150° C. to 290° C. Incidentally, as for the method to control the amount of a dehydroabietic acid, for example, a dehydroabietic acid isolated by crystallization as an ethanolamine salt from a disproportionated rosin (*J. Org. Chem.*, 31, 4246 (1996)) may be added to fall in the range above.

The rosin may be also a hydrogenated rosin. The hydrogenated rosin contains, for example, a tetrahydroabietic acid and a dihydroabietic acid as major components and is obtained by eliminating an unstable conjugated double bond in the molecule by a known hydrogenation reaction. The hydrogenation reaction is performed by heating an unpurified rosin in the presence of a hydrogenation catalyst under a hydrogen pressure of usually from 10 Kg/cm$^2$ to 200 Kg/cm$^2$, preferably from 50 Kg/cm$^2$ to 150 Kg/cm$^2$. Examples of the hydrogenation catalyst include various known catalysts, for example, a supported catalyst such as palladium carbon, rhodium carbon and platinum carbon, a metal powder such as nickel and platinum, iodine, and an iodide such as iron iodide. The amount of the catalyst used is usually from 0.01 mass % to 5 mass %, preferably from 0.01 mass % to 1.0 mass %, and the reaction temperature is from 100° C. to 300° C., preferably from 150° C. to 290° C.

As for these disproportionated rosin and hydrogenated rosin, the above-described purification step may be provided before or after the disproportionation treatment or the hydrogenation treatment.

The rosin may be a polymerized rosin obtained by polymerizing a rosin, an unsaturated carboxylic acid-modified rosin obtained by adding an unsaturated carboxylic acid to a rosin, or a phenol-modified rosin. Examples of the unsaturated carboxylic acid used for the preparation of the unsaturated carboxylic acid-modified rosin include maleic acid, maleic anhydride, fumaric acid, acrylic acid, and methacrylic acid. The unsaturated carboxylic acid-modified rosin is modified usually by using approximately from 1 part by mass to 30 parts by mass of an unsaturated carboxylic acid per 100 parts by mass of the raw material rosin.

Among rosins, in order to obtain a homogeneous polyester resin (A) in which the reactivity is uniform and the residual monomer or side reaction is suppressed, it is preferred to use a purified rosin prepared through a purification treatment, a disproportionated rosin prepared through a disproportionation treatment, or a hydrogenated rosin prepared through a hydrogenation treatment. One of these may be used alone, or some may be used as a mixture.

A homogeneous polyester resin (A) is advantageous in that control of the electrostatic properties of the toner is more facilitated.

Also, when such a rosin is applied, the phase dissolution of the toner is more improved, as a result, the uniformity of image gloss at high-speed low-temperature fixing or low-pressure fixing is more readily improved.

Exemplary compounds of the specific rosin diol represented by formula (1) are illustrated below, but the present exemplary embodiment is not limited thereto.

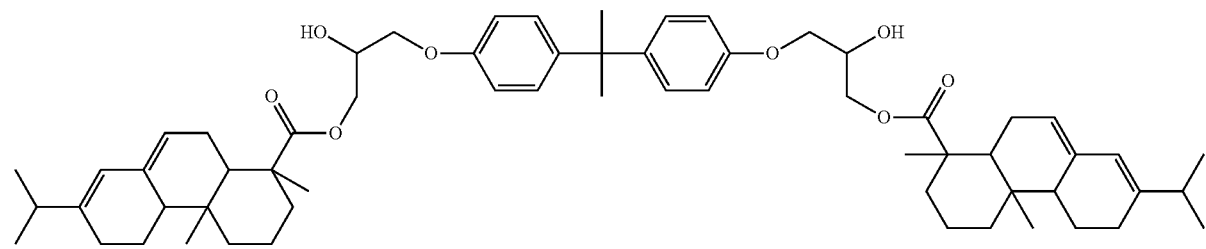

(1)

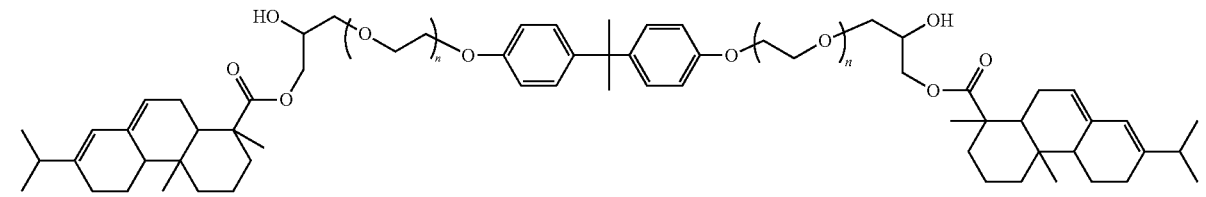

(2)

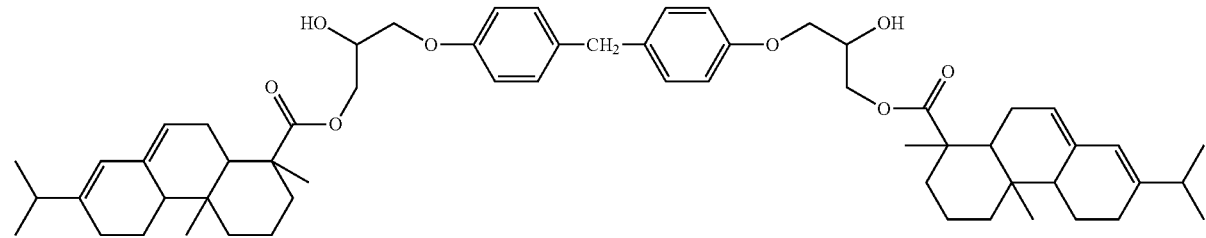

(3)

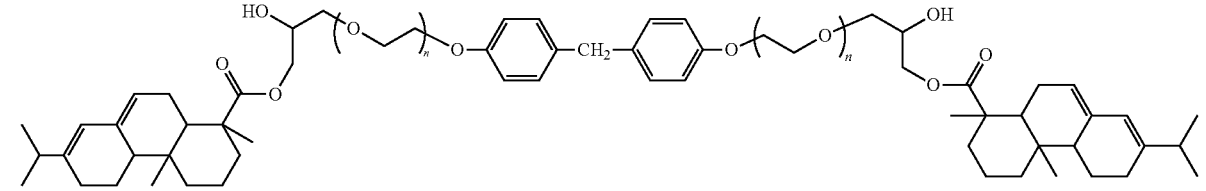

(4)

-continued
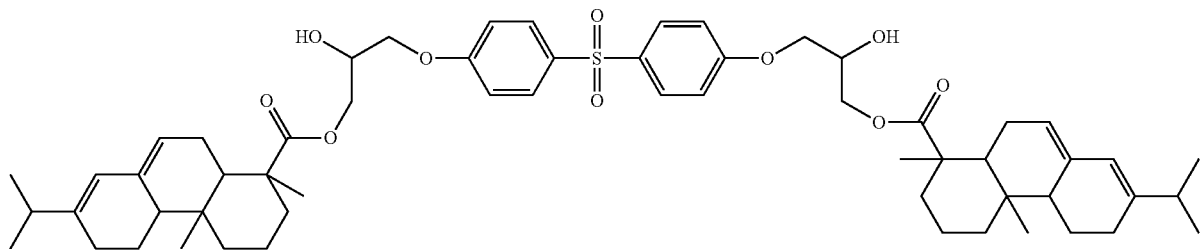
(5)
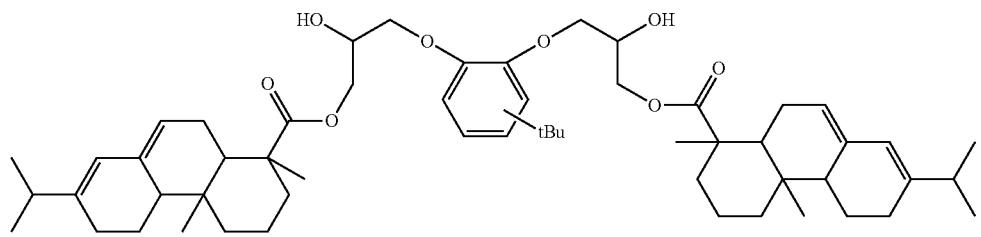
(6)
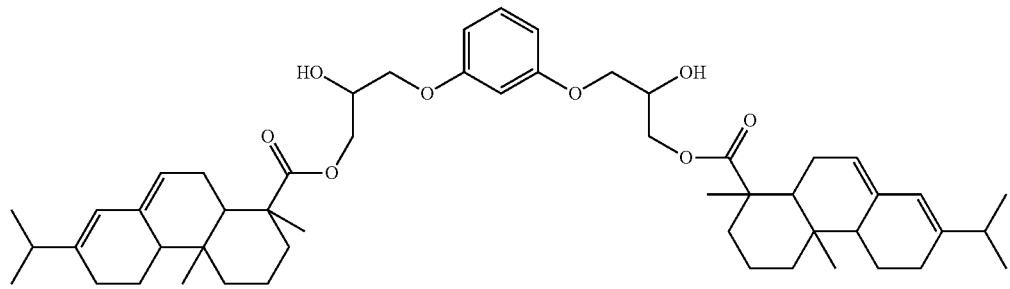
(7)
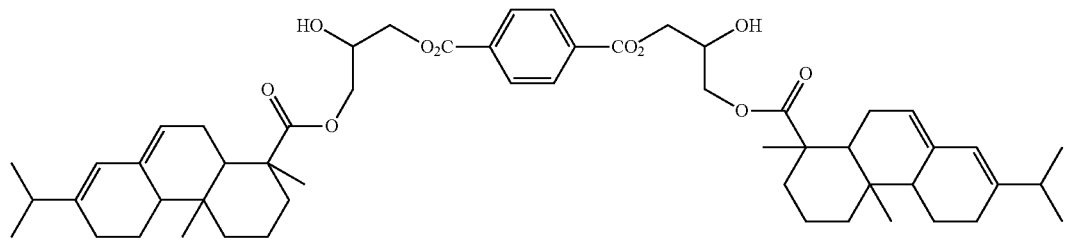
(8)
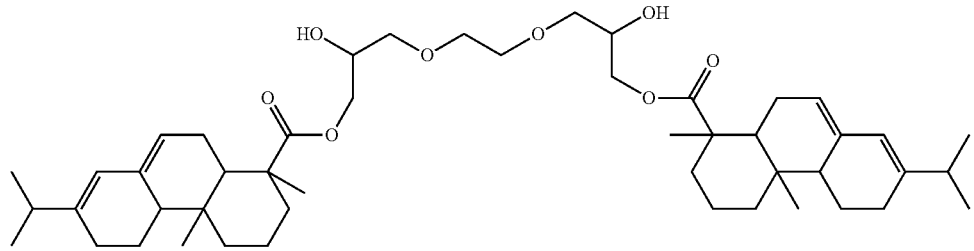
(9)
(10)

-continued
(12)
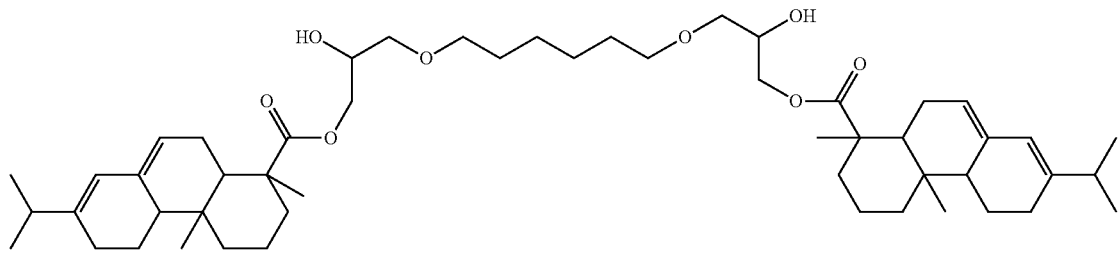
(13)
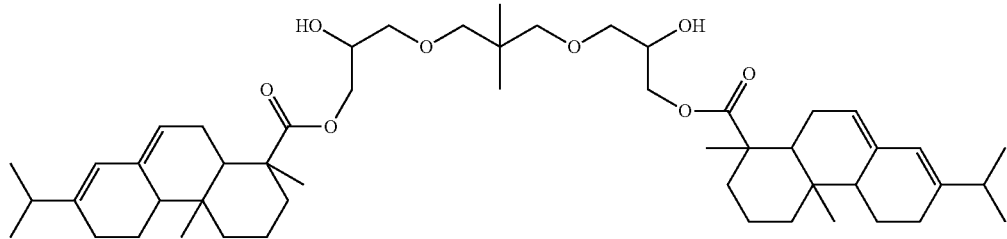
(14)
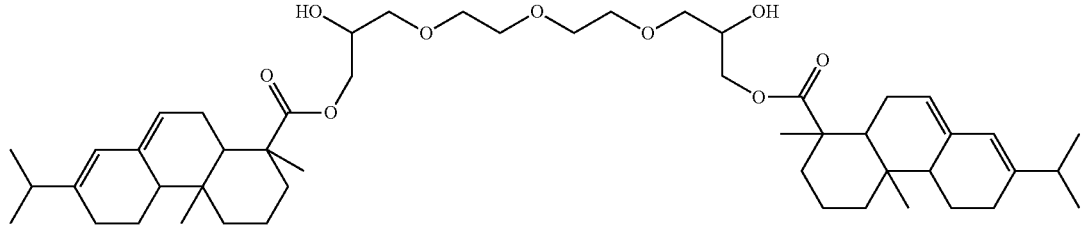
(15)
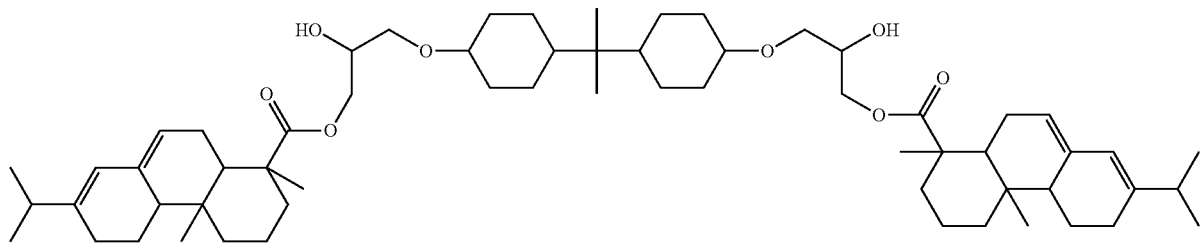
(16)
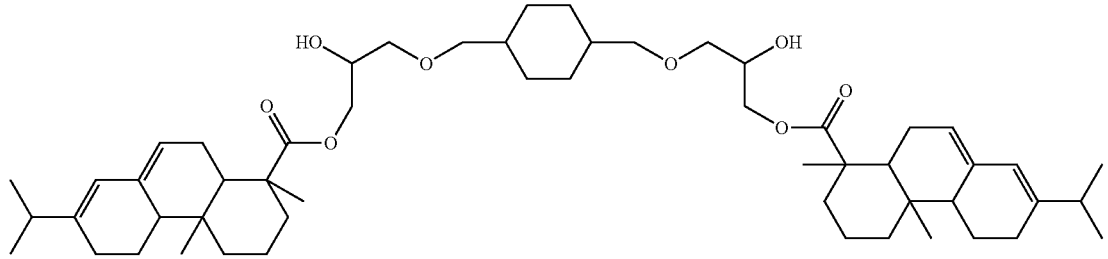
(17)
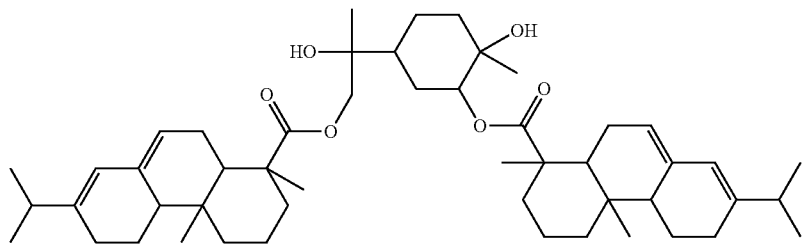

(18)
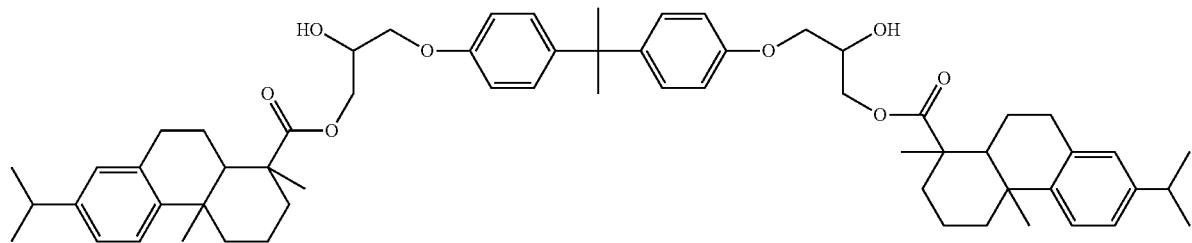
(19)
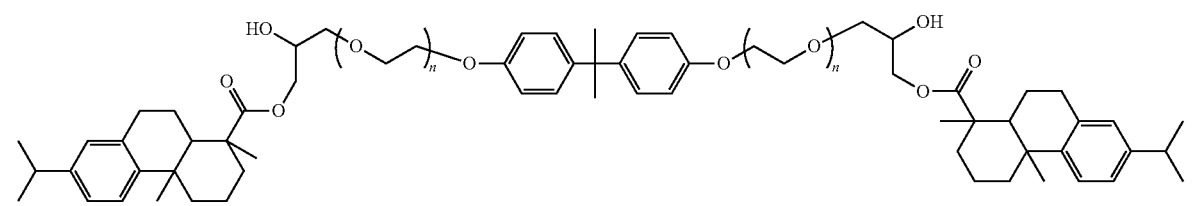
(20)
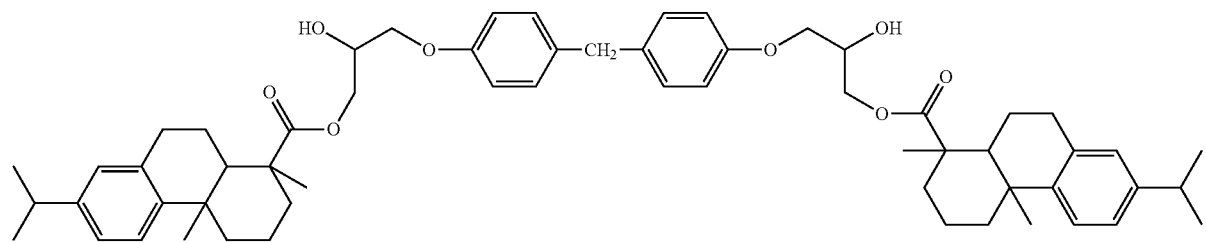
(21)
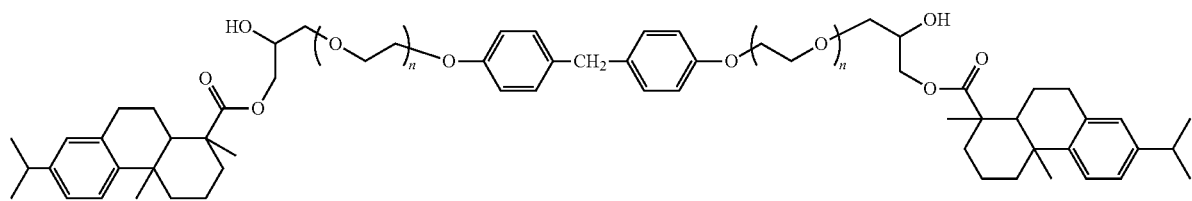
(22)
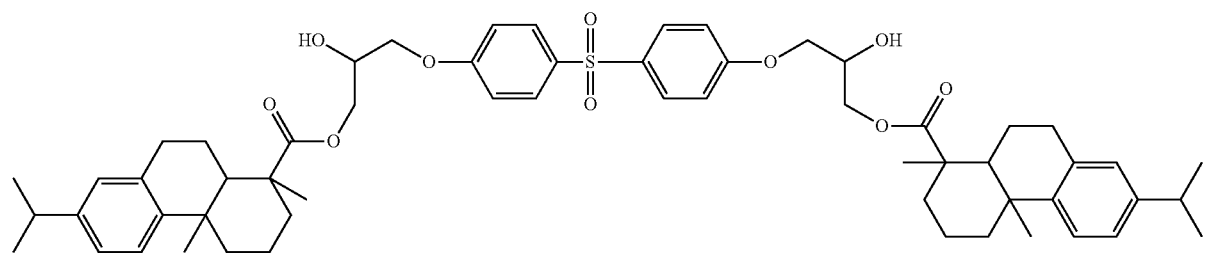
(23)
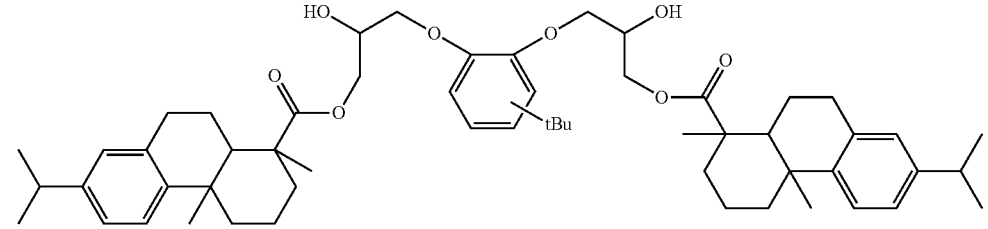

-continued
(24)
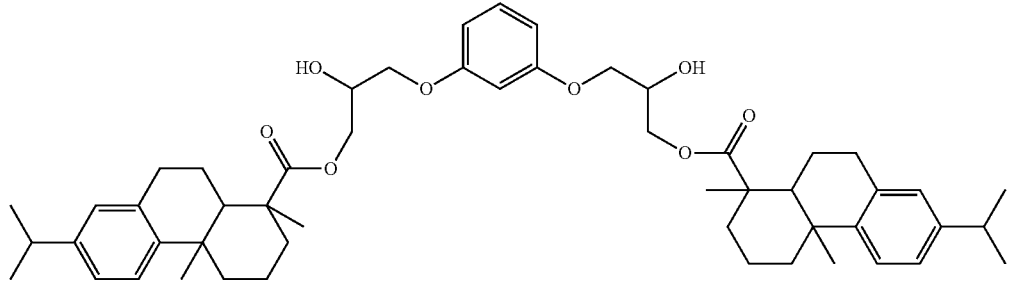
(25)
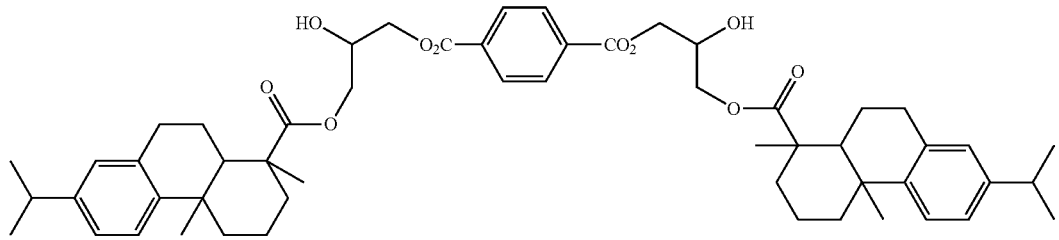
(26)
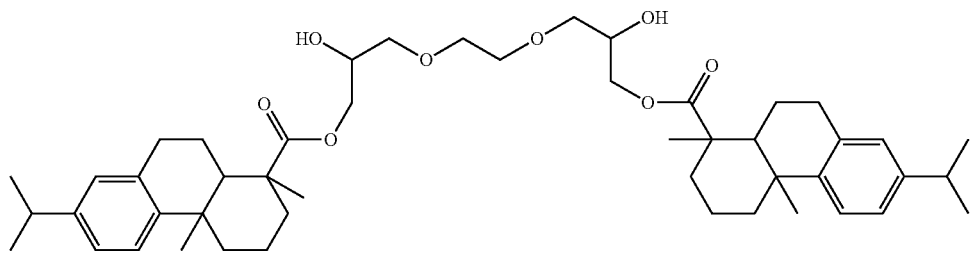
(27)
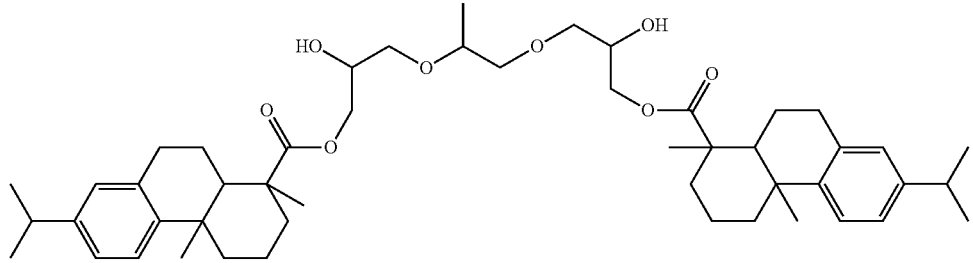
(28)
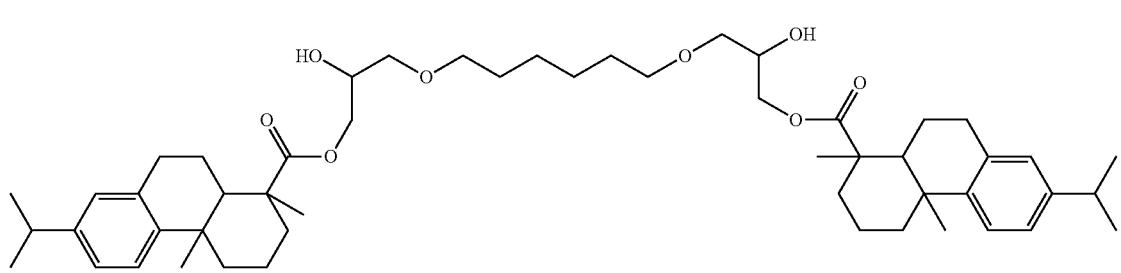
(29)
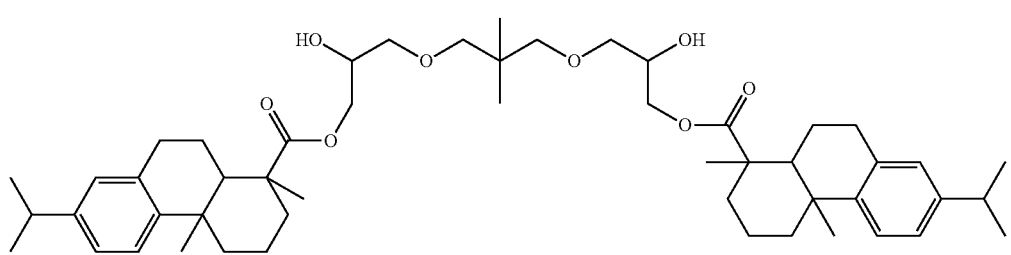

-continued
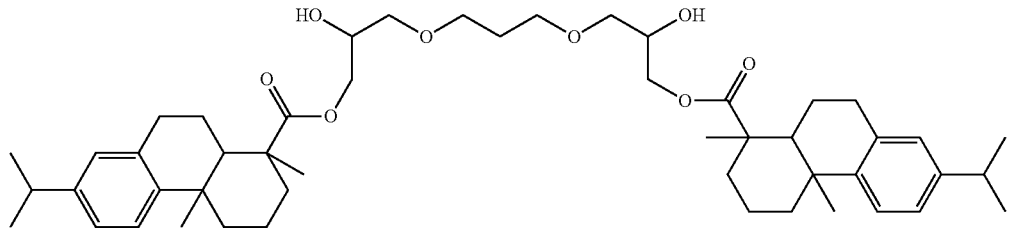
(30)
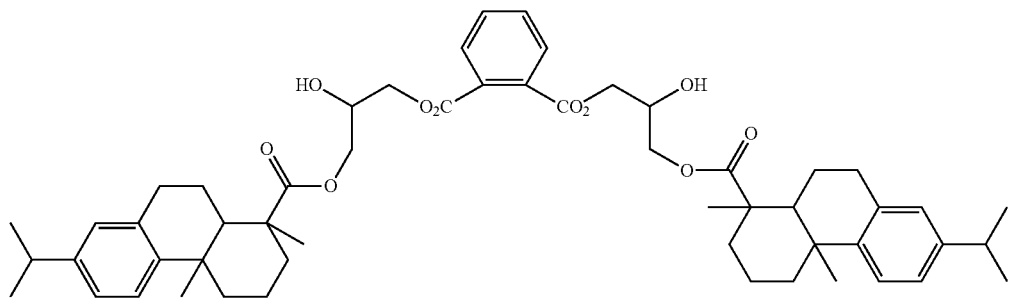
(31)
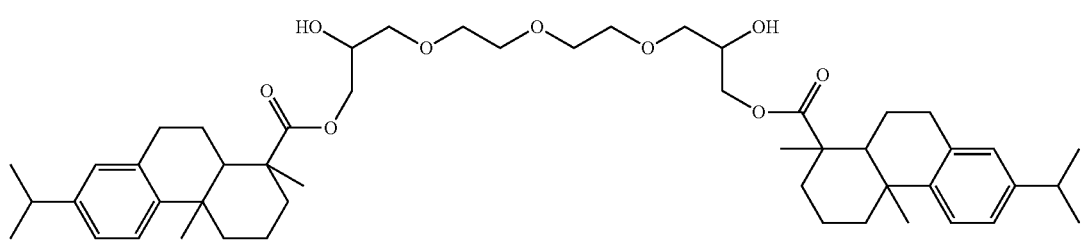
(32)
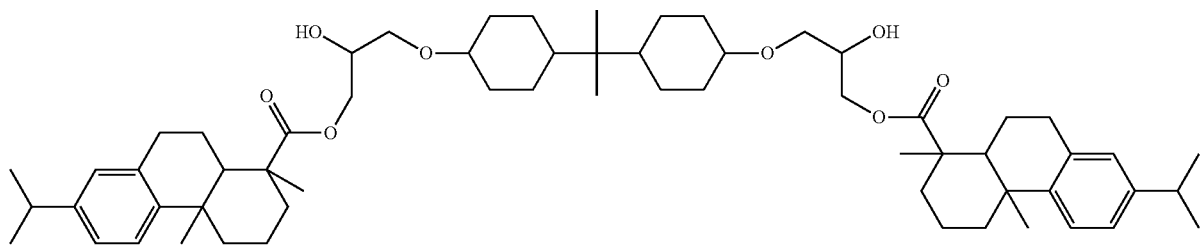
(33)
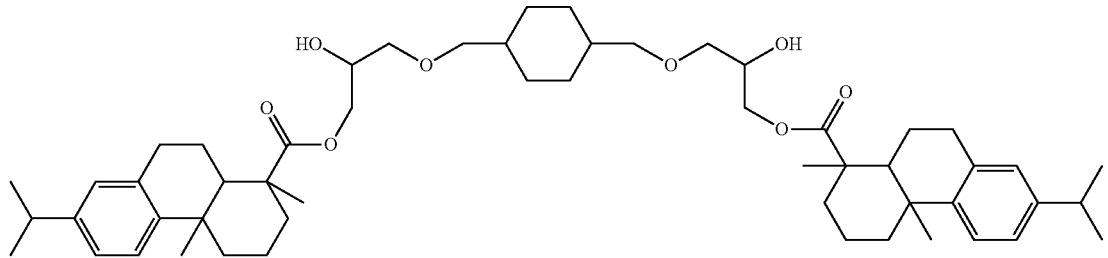
(34)
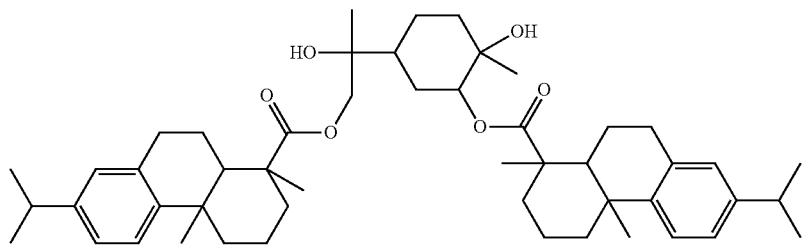
(35)

-continued
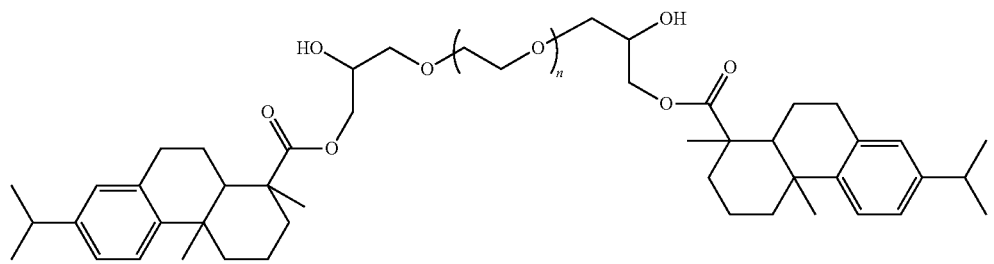 (36)
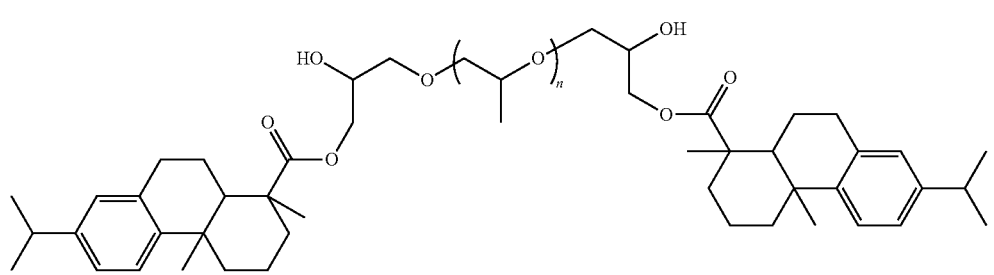 (37)
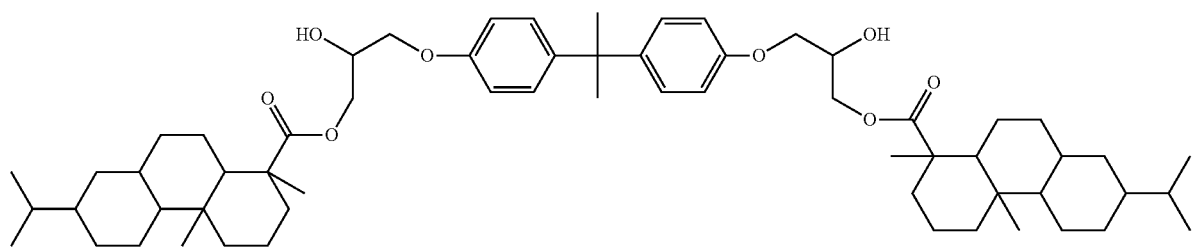 (38)
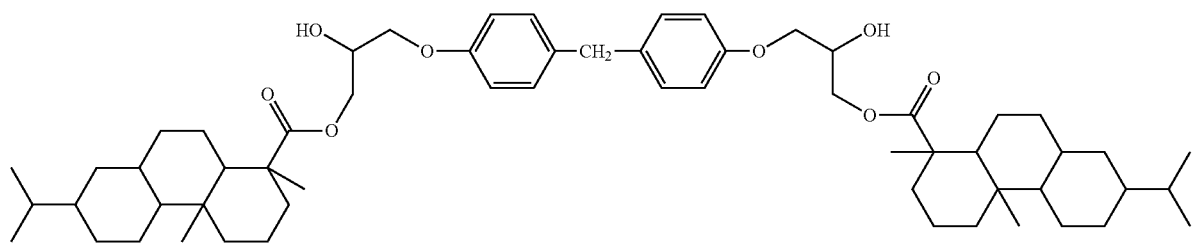 (39)
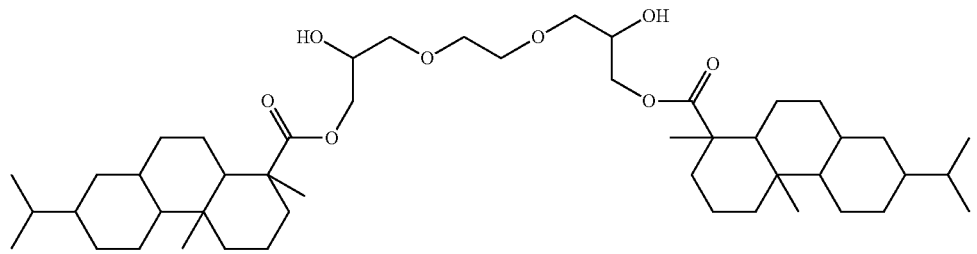 (40)
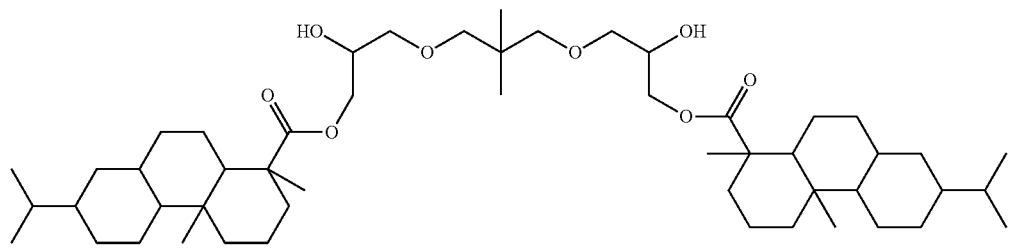 (41)

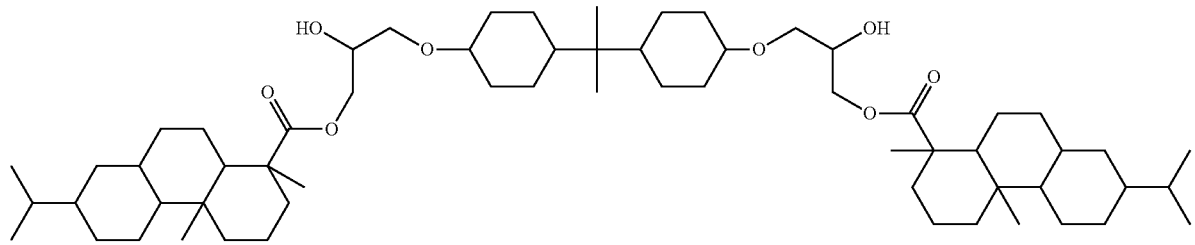

(42)

In the exemplary compounds of the specific rosin diol, n represents an integer of 1 or more.

In synthesizing the polyester resin (A), a dialcohol component other than the specific rosin diol may be used in combination as the dialcohol. In the present exemplary embodiment, in view of fixing property, the content of the specific rosin diol is preferably from 10 mol % to 100 mol %, more preferably from 20 mol % to 90 mol %, still more preferably from 30 mol % to 70 mol %, in the dialcohol components.

In the polyester resin (A), at least one member selected from an aliphatic diol and an etherified diphenol may be polycondensed as an alcohol component other than the specific rosin diol as long as it does not impair the performance of the toner when applied to the toner.

Examples of the aliphatic diol include ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 3-hydroxy-2,2-dimethylpropyl-3-hydroxy-2,2-dimethylpropanoate, diethylene glycol, triethylene glycol, polyethylene glycol, dipropylene glycol, and polypropylene glycol. One of these aliphatic diols may be used alone, or two or more thereof may be used in combination.

Also, an etherified diphenol may be further used together with the aliphatic diol. The etherified diphenol is a diol obtained by addition reaction of bisphenol A and an alkylene oxide. The alkylene oxide is ethylene oxide or propylene oxide. The average number of moles of the alkylene oxide added is preferably from 2 mol to 16 mol per mol of the bisphenol A.

The polycondensate constituting the polyester resin (A) is obtained by conventionally known polycondensation using, as raw materials, the above-described dicarboxylic acid and a dialcohol containing the specific rosin diol.

As the reaction method therefor, either a transesterification reaction or a direct esterification reaction can be applied. Also, the polycondensation may be accelerated by a method of increasing the reaction temperature under pressure or a method of flowing an inert gas under reduced pressure or ambient pressure. Depending on the reaction, a conventionally known reaction catalyst such as at least one metal compound selected from antimony, titanium tin, zinc, aluminum, manganese and germanium may be used to accelerate the reaction. The amount of the reaction catalyst added is preferably from 0.01 parts by mass to 1.5 parts by mass, more preferably from 0.05 parts by mass to 1.0 parts by mass, per 100 parts by mass of the total amount of the acid component and the alcohol component. The reaction temperature is preferably from 180° C. to 300° C.

[Polyester Resin (B)]

The polyester resin (B) is an amorphous resin differing in the weight average molecular weight from the polyester resin (A).

The polyester resin (B) may be a general-purpose polyester resin containing mainly a repeating unit derived from a polyvalent carboxylic acid component and a repeating unit derived from a polyhydric alcohol component (a polyester resin containing a repeating unit derived from a polyhydric alcohol component having no rosin structure), or similarly to the polyester resin (A), may be a polyester resin containing at least a repeating unit derived from a dicarboxylic acid component and a repeating unit derived from a dialcohol component represented by formula (1).

However, from the standpoint that the phase dissolution of the toner is more improved and in turn, the uniformity of image gross at high-seed low-temperature fixing or low-pressure fixing is more readily enhanced, the polyester resin (B) is, similarly to the polyester resin (A), preferably a polyester resin containing at least a repeating unit derived from a dicarboxylic acid component and a repeating unit derived from a dialcohol component represented by formula (1).

[Physical Properties of Polyester Resin (A) and Polyester Resin (B)]

The difference (absolute value) in the weight average molecular weight between the polyester resin (A) and the polyester resin (B) is from 30,000 to 100,000 or from about 30,000 to about 100,000, preferably from 4,000 to 90,000 or from about 4,000 to about 90,000.

By setting the difference (absolute value) in the weight average molecular weight between the polyester resin (A) and the polyester resin (B) to the range above, a toner excellent in phase dissolution is obtained. Also, because the toner is excellent in phase dissolution, uniformity of image gloss at high-speed low-temperature fixing or low-pressure fixing can be realized.

Specifically, for example, when the difference in the weight average molecular weight is 30,000 or more or about 30,000 or more, the low-temperature fixing property or low-pressure fixing property of the toner and the preservability of the fixed image are ensured, and when the difference is 100,000 or less or about 100,000 or less, uniform image glossiness is obtained at high-speed low-temperature fixing or low-pressure fixing.

However, in view of durability and hot offset resistance of the tonner, the weight average molecular weight (Mw) of each of the polyester resin (A) and the polyester resin (B) is preferably from 4,000 to 1,000,000 or from about 4,000 to about 1,000,000, more preferably from 7,000 to 300,000 or from about 7,000 to about 300,000.

The difference (absolute value) in the softening temperature between the polyester resin (A) and the polyester resin (B) is from 5° C. to 25° C., preferably from 7° C. to 20° C.

By setting the difference in the softening temperature between the polyester resin (A) and the polyester resin (B) to the range above, uniform compatibility of two resins is encouraged and phase dissolution of the toner is more enhanced, as a result, uniformity of the image gloss at high-seed low-temperature fixing or low-pressure fixing is more readily improved.

However, in view of fixing property, storability and durability of the toner, the softening temperature of each of the polyester resin (A) and the polyester resin (B) is preferably from 80° C. to 160° C., more preferably from 90° C. to 140° C.

In view of fixing property, storability and durability of the toner when the resin is used as the binder resin of the toner, the glass transition temperature of each of the polyester resin (A) and the polyester resin (B) is preferably from 35° C. to 80° C., more preferably from 40° C. to 75° C., still more preferably from 50° C. to 65° C.

In view of electrostatic properties of the toner, the acid value of the polyester resin (A) is from 3 mgKOH/g to 30 mgKOH/g, preferably from 9 mgKOH/g to 21 mgKOH/g. If the acid value exceeds 30 mgKOH/g, the resin is liable to contain water and particularly in the summer environment, the electrostatic properties are deteriorated, whereas if the acid value is less than 3 mgKOH/g, the electrostatic properties may be extremely impaired.

The polyester resin (A) contains a rosin ester group, and the rosin ester group is a hydrophobic and bulky group. Also, the air interface of the toner is generally hydrophobic and therefore, the rosin ester group is likely to be exposed to the surface of the toner of the present exemplary embodiment containing the polyester resin (A). If the amount of the rosin ester group exposed to the toner surface is large, the electrostatic properties of the toner may be deteriorated. In the present exemplary embodiment, the acid value of the polyester resin (A) is set to be from 3 mgKOH/g to 30 mgKOH/g, whereby the toner is adjusted to have a preferred electric charge amount.

On the other hand, in view of the electrostatic properties of the toner, the acid value of the polyester resin (B) is preferably from 1 mgKOH/g to 50 mgKOH/g, more preferably from 3 mgKOH/g to 30 mgKOH/g.

However, in the case where similarly to the polyester resin (A), a polyester resin containing at least a repeating unit derived from a dicarboxylic acid component and a repeating unit derived from a dialcohol component represented by formula (1) is applied as the polyester resin (B), the acid value of the polyester resin (B) is preferably the same as the acid value of the polyester resin (A).

Incidentally, the mass average molecular weight Mw, the number average molecular weight Mn, the softening temperature, the glass transition temperature and the acid value of each polyester resin are values determined by the methods described in Examples.

Also, respective physical properties of each polyester resin can be easily adjusted, for example, by adjusting the raw material monomer composition, the polymerization initiator, the molecular weight, the catalyst amount or the like or selecting the reaction conditions.

[Preferred Combination of Polyester Resin (A) and Polyester Resin (B)]

Preferred combinations of the polyester resin (A) and the polyester resin (B) include the followings:

1) a combination where both the polyester resin (A) and the polyester resin (B) are a polyester resin containing at least a repeating unit derived from a dicarboxylic acid component and a repeating unit derived from a dialcohol component represented by formula (1); and 2) a combination where at least either one (preferably both) of the polyester resin (A) and the polyester resin (B) is a polyester resin containing a repeating unit derived from a component having a bisphenol structure (preferably a bisphenol A structure).

In the case of such a combination, many aromatic rings attributable to a rosin and many aromatic rings attributable to a bisphenol structure are present in each polyester resin. Because an interaction occurs between two aromatic rings at an ordinary temperature (for example, 25° C.) and the interaction disappears at a low temperature, the low-pressure fixing property and the image strength are likely to be enhanced. In addition, uniform compatibility between two resins is encouraged and the phase dissolution of the toner is more enhanced, as a result, uniformity of the image gloss at high-seed low-temperature fixing or low-pressure fixing is readily more increased.

Here, in the polyester resin containing a repeating unit derived from a component having a bisphenol structure (preferably a bisphenol A structure), the component having a bisphenol structure (preferably a bisphenol A structure) may be either a carboxylic acid component or an alcohol component but is preferably an alcohol component. Specifically, in the case of the polyester resin (A), $L^1$ in formula (1) is preferably a group having a bisphenol structure (preferably a bisphenol A structure).

The ratio ((A)/(B)) of the polyester resin (A) and the polyester resin (B) is, in mass ratio, preferably from 2/8 to 8/2, more preferably from 3/7 to 7/3.

By setting the ratio of the polyester resin (A) and the polyester resin (B) to the range above, uniform compatibility of two resins is encouraged and phase dissolution of the toner is more enhanced, as a result, uniformity of the image gloss at high-seed low-temperature fixing or low-pressure fixing is readily more increased.

Incidentally, the polyester resin (A) and the polyester resin (B) may be a modified polyester resin. The modified polyester resin includes a polyester which is grafted or blocked with phenol, urethane, epoxy or the like by the method described, for example, in JP-A-11-133668, JP-A-10-239903 and JP-A-8-20636,

[Other Components Constituting Toner]

The toner according to the present exemplary embodiment contains, as the binder resin, the polyester resin (A) and the polyester resin (B) (hereinafter, both resins are collectively simply referred to as "polyester resin") and, if desired, may contain other components such as coloring agent, release agent, charge controlling agent and external additive.

In the toner according to the present exemplary embodiment, a known binder resin, for example, a vinyl-based resin such as styrene-acryl resin, an epoxy resin and other resins such as polycarbonate and polyurethane, may be used in combination with the polyester resin as long as the effects attributable to the polyester resin are not impaired.

The content of the polyester resin in the binder resin constituting the toner is preferably 60 mass % or more, more preferably 80 mass % or more, still more preferably substantially 100 mass %.

(Coloring Agent)

The coloring agent used in the present exemplary embodiment may be a dye or a pigment. A pigment is preferred in terms of light fastness and water fastness.

The coloring agent may be a pigment known in the art. Examples of preferred coloring agents include carbon black, aniline black, Aniline Blue, Calcoil Blue, Chrome Yellow, Ultramarine Blue, DuPont Oil Red, Quinoline Yellow, Methylene Blue Chloride, Phthalocyanine Blue, Malachite Green Oxalate, Lamp Black, Rose Bengal, quinacridone, Benzidine Yellow, C.I. Pigment Red 48:1, C.I. Pigment Red 57:1, C.I. Pigment Red 122, C.I. Pigment Red 185, C.I. Pigment Red 238, C.I. Pigment Yellow 12, C.I. Pigment Yellow 17, C.I. Pigment Yellow 180, C.I. Pigment Yellow 97, C.I. Pigment Yellow 74, C.I. Pigment Blue 15:1, and C.I. Pigment Blue 15:3.

The content of the coloring agent is preferably in the range of 1 part by mass to 30 parts by mass, based on 100 parts by mass of the binder resin. If needed, it is also effective to use a surface-treated coloring agent or a pigment dispersant. The color of the toner of the present exemplary embodiment can be determined by selecting the kind of the coloring agent. For example, the toner of the present exemplary embodiment may be yellow, magenta, cyan or black in color.

(Release Agent)

Examples of release agents for use in the present exemplary embodiment include: paraffin waxes, such as low molecular weight polypropylenes, low molecular weight polyethylenes; silicone resins; rosins; rice wax; and carnauba wax. The melting temperatures of these release agents are preferably between 50° C. and 100° C., more preferably between 60° C. and 95° C. The content of the release agent in the toner is preferably from 0.5% by mass to 15% by mass, more preferably from 1.0% by mass to 12% by mass. The presence of the release agent in an amount of 0.5% by mass or more particularly prevents the occurrence of peeling defects in oilless fixing. Meanwhile, the presence of the release agent in an amount of 15% by mass or less improves image quality and reliability for image formation without causing deterioration in the flowability of the toner.

(Charge Controlling Agent)

The charge controlling agent may be any of those known in the art, for example, azo-based metal complex compounds, metal complex compounds of salicylic acid and resin type charge controlling agents containing polar groups.

(External Additive)

The toner of the present exemplary embodiment may contain an inorganic powder as the external additive of toner particles for purpose of achieving improved flowability. Examples of suitable inorganic powders include silica powder, alumina, titanium oxide, barium titanate, magnesium titanate, calcium titanate, strontium titanate, zinc oxide, silica, clay, mica, wollastonite, diatomite, chromium oxide, cerium oxide, bengala, antimony trioxide, magnesium oxide, zirconium oxide, barium sulfate, barium carbonate, calcium carbonate, silicon carbide and silicon nitride. Silica powder is particularly preferred. The mixing proportion of the inorganic powder in the toner is typically in the range of 0.01 parts by mass to 5 parts by mass, preferably 0.01 parts by mass to 2.0 parts by mass, based on 100 parts by mass of the toner. The inorganic powder may be used in combination with another material known in the art, for example, silica, titanium, resin particles (such as polystyrene, PMMA and melamine resin particles) or alumina. The toner of the present exemplary embodiment may further include a cleaning lubricant. The cleaning lubricant may be a metal salt of a higher fatty acid, typified by zinc stearate, or a powder of fluorinated polymer particles.

[Characteristics of Toner]

The shape factor SF1 of the toner according to the present exemplary embodiment is preferably in the range of 110 to 150, more preferably 120 to 140.

The shape factor SF1 is calculated by Equation 1:

$$SF1=(ML^2/A)\times(\pi/4)\times 100 \qquad (1)$$

where ML represents the absolute maximum length of the toner and A represents the projection area of the toner.

SF1 is mainly quantified by analyzing a microscope image or scanning electron microscope image using an image analyzer. First, an optical microscope image of particles spread on the surface of a slide glass is inputted to a Luzex image analyzer via a video camera. The maximum lengths and projection areas of 100 of the particles are measured and substituted into Equation 1. The obtained values are averaged.

The volume average particle diameter of the toner according to the present exemplary embodiment is preferably from 4 μm to 15 μm, more preferably from 4 μm to 10 μm, still more preferably from 4 μm to 8 μm.

Here, the volume average particle diameter is measured using a Coulter multisizer (manufactured by Beckman Coulter, Inc.) with an aperture diameter of 50 μm. The measurement is performed after dispersing the toner in an aqueous electrolyte solution (an isotonic aqueous solution) and further ultrasonically dispersing it for 30 seconds or more.

[Production Method of Toner]

There is no particular restriction on the production method of the toner. For example, the toner particles are produced by a dry method, such as kneading-pulverization, or a wet method, such as emulsification aggregation or suspension polymerization. These methods are well known in the art. If necessary, an external additive may be added to the toner particles.

According to a kneading-pulverization method, toner-forming materials including a binder resin are kneaded to obtain a kneaded product, followed by pulverization to produce toner particles.

More specifically, the kneading-pulverization method includes a process for kneading toner-forming materials including a binder resin and a process for pulverizing the kneaded product. If needed, the kneading-pulverization method may further one or more processes, such as a process for cooling the kneaded product after the kneading process.

Details regarding the individual processes will be provided below.

—Kneading Process—

In the kneading process, toner-forming materials including a binder resin are kneaded.

In the kneading process, it is preferred to add an aqueous medium (for example, distilled water, ion exchanged water or an alcohol) in an amount of 0.5 parts by mass to 5 parts by mass, based on 100 parts by mass of the toner-forming materials.

Kneaders, such as single screw extruders and twin screw extruders, may be used in the kneading process. As a non-limiting example, a kneader having a transfer screw section and two kneading sections will be explained with reference to the drawing.

FIG. 1 is a diagram for explaining the state of a screw in an example of a screw extruder used in a method for the production of a toner according to the present exemplary embodiment.

A screw extruder 11 includes a barrel 12 equipped with a screw (not shown), a feed port 14 through which toner-forming materials as raw materials for a toner is fed into the barrel 12, a liquid introducing port 16 through which an aqueous medium is added to the toner-forming materials in the barrel 12, and a discharge port 18 through which a kneaded product of the toner-forming materials in the barrel 12 is discharged.

The barrel 12 is divided into a transfer screw section SA, a kneading section NA, a transfer screw section SB, a kneading section NB and a transfer screw section SC, which are located in this order from a side close to the feed port 14. The transfer screw section SA transports the toner-forming materials fed through the feed port 14 to the kneading section NA. In the kneading section NA, the toner-forming materials are melt-kneaded by a first kneading process. The transfer screw section SB transports the melt-kneaded toner-forming materials from the kneading section NA to the kneading section NB. In the kneading section NB, the toner-forming material is melt-kneaded by a second kneading process to form a kneaded product. The transfer screw section SC transports the kneaded product to the discharge port 18.

Further, the barrel 12 has blocks 12A to 12J provided with different temperature controlling units (not shown). That is, the blocks 12A to 12J may be controlled to different temperatures. FIG. 1 shows the temperatures of the blocks. Specifically, the blocks 12A and 12B are controlled to a temperature of t0° C., the blocks 12C to 12E are controlled to a temperature of t1° C., and the blocks 12F to 12J are controlled to a temperature of t2° C. With this block configuration, the toner-forming materials in the kneading section NA are heated to t1° C. and the toner-forming materials in the kneading section NB are heated to t2° C.

The toner-forming materials including a binder resin are fed into the barrel 12 through the feed port 14 and are sent to the kneading section NA by the transfer screw section SA. The toner-forming materials are heated to the temperature (t1° C.) set in the block 12C and are converted into a molten state. The molten toner-forming materials are sent to and introduced into the kneading section NA. In the kneading section NA, the toner-forming materials are melt-kneaded at the temperature (t1° C.) set in the blocks 12D and 12E. The binder resin is melted in the kneading section NA and is sheared by the screw.

Subsequently, the toner-forming materials having undergone kneading in the kneading section NA are sent to the kneading section NB by the transfer screw section SB.

Subsequently, an aqueous medium is fed into the barrel 12 through the liquid introducing port 16 and is added to the toner-forming materials in the transfer screw section SB. FIG. 1 shows the state in which the aqueous medium is fed in the transfer screw section SB, but the feeding position of the aqueous medium is not limited thereto. For example, the aqueous medium may be fed in the kneading section NB and may be fed in both the transfer screw section SB and the kneading section NB. That is, the feeding position and site of the aqueous medium are selected according to the intended need.

As described above, the aqueous medium is fed into the barrel 12 through the liquid introducing port 16 and is mixed with the toner-forming materials in the barrel 12. The toner-forming materials are cooled down by the latent heat of vaporization of the aqueous medium and are maintained at an appropriate temperature.

Finally, the toner-forming materials are melt-kneaded in the kneading section NB to form a kneaded product and are transported to and discharged from the discharge port 18. In this way, the toner-forming materials are kneaded using the screw extruder 11 illustrated in FIG. 1 is carried out.

—Cooling Process—

In the cooling process, the kneaded product formed by the kneading process is cooled. In the cooling process, it is preferred to lower the temperature of the kneaded product to 40° C. or below at an average rate of at least 4° C./sec. By this rapid temperature drop at the average rate, the dispersed state of the kneaded product immediately after completion of the kneading process is maintained. The average cooling rate refers to an average of the cooling rates from the temperature of the kneaded product (for example, t2° C. in the case using the screw extruder 11 of FIG. 1) after completion of the kneading process to 40° C.

Specifically, the cooling process may be carried out, for example, using a roll where cooling water or brine is circulated and a press-fit type cooling belt. When this method is used for the cooling process, the cooling rate is determined depending on the speed of the roll, the flow amount of the brine, the feed amount of the kneaded product, the thickness of a slab upon rolling of the kneaded product, etc. The thickness of the slab is preferably from 1 mm to 3 mm.

—Pulverization Process—

In the pulverization process, the kneaded product cooled by the cooling process is pulverized to particles. For example, a mechanical pulverizer or jet pulverizer is used in the pulverization process.

—Classification Process—

If needed, the particles obtained by the pulverization process may be classified. By the classification process, toner particles having a volume average particle diameter in a desired range are selected, and particles having a particle diameter smaller than the lower limit of the desired range and particles having a particle diameter larger than the upper limit of the desired range are removed. For example, a traditional classifier, such as a centrifugal classifier or an inertial classifier, may be used in the classification process.

—External Addition Step—

The above-described inorganic powder may be externally added to the obtained toner particle for the purpose of, for example, adjusting the electrostatic charge, imparting flowability, or imparting charge exchangeability. The external addition is performed, for example, by a V-type blender, a Henschel mixer or a Roedige mixer, and the inorganic powder is attached in divided stages.

—Sieve Classification Process—

If necessary, a sieve classification process may be carried out after the external addition process. Specifically, the sieve classification process may be carried out, for example, using gyro shifter, a vibro classifier or a turbo classifier. By the sieve classification, coarse powders of the external additives are removed to inhibit the formation of stripes on a photoconductor, dirt in the apparatus, etc.

In the toner according to the present exemplary embodiment, a polyester resin (A) and a polyester resin (B) are used in combination, and two resins are preferably present as a uniform mixture in the toner. In order to let the toner take such a form, the toner is preferably produced by a wet process such as emulsion aggregation method and suspension polymerization method.

The emulsion aggregation method may include an emulsification step of emulsifying raw materials constituting the toner to form a resin particle (emulsified particle), an aggregation step of forming an aggregate containing the resin particle, and a fusing step of fusing aggregates The steps are specifically described below.

—Emulsification Step—

For example, the production of a resin particle dispersion liquid may be performed by applying a shear force by means of a disperser to a solution in which an aqueous medium and the binder resin are mixed. At this time, a particle may be formed by heating the solution to decrease the viscosity of the resin component. Also, a dispersant may be used for stabilizing the dispersed resin particles, Furthermore, when the resin is a resin capable of dissolving in an oily solvent having relatively low solubility in water, the resin is dissolved in such a solvent, the solution is dispersed into particles in water together with a dispersant or a polymer electrolyte, and thereafter, the solvent is evaporated by heating or reducing pressure. whereby a resin particle dispersion liquid is produced.

In preparing the resin particle dispersion liquid, one resin particle dispersion liquid may be prepared in a state where the polyester resin (A) and the polyester resin (B), used as the binder resin, are mixed in the above-described ratio, or two resin particle dispersion liquids containing respective resins may be prepared and mixed in the later aggregation step. The mixing conditions such as mixing sequence are not particularly limited.

Examples of the aqueous medium include water such as distilled water and ion-exchanged water, and alcohols, but the aqueous medium is preferably water.

Examples of the dispersant used in the emulsification step include a water-soluble polymer such as polyvinyl alcohol, methyl cellulose, ethyl cellulose, hydroxyethyl cellulose, carboxymethyl cellulose, sodium polyacrylate and sodium polymethacrylate: a surfactant, for example, an anionic surfactant such as sodium dodecylbenzenesulfonate, sodium octadecylsulfate, sodium oleate, sodium laurate and potassium stearate, a cationic surfactant such as laurylamine acetate, stearylamine acetate and lauryltrimethylammonium chloride, an amphoteric ionic surfactant such as lauryldimethylamine oxide, and a nonionic surfactant such as polyoxyethylene alkyl ether, polyoxyethylene alkylphenyl ether and polyoxyethylene alkylamine; and an inorganic salt such as tricalcium phosphate, aluminum hydroxide, calcium sulfate, calcium carbonate and barium carbonate.

Examples of the disperser used in the production of the emulsion include a homogenizer, a homomixer, a pressurization kneader, an extruder; and a media disperser. As for the size of the resin particle, the average particle diameter (volume average particle diameter) thereof is preferably from 1.0 μm or less, more preferably from 60 nm to 300 nm, still more preferably from 150 nm to 250 nm. If the particle size is less than 60 nm, the resin particle becomes a stable particle in the dispersion liquid and this sometimes makes the aggregation of resin particles difficult, whereas if it exceeds 1.0 μm, the aggregating propensity of resin particles is increased and formation of a toner particle is facilitated, but the particle size distribution of the toner may be broadened.

In preparing a release agent dispersion liquid, a release agent is dispersed in water together with an ionic surfactant or a polymer electrolyte such as polymer acid and polymer base, and the dispersion is heated at a temperature not less than the melting temperature of the release agent and at the same time, dispersion-treated using a homogenizer capable of applying a strong shear force or a pressure-ejection type disperser. By passing through the treatment above, a release agent dispersion liquid is obtained. At the dispersion treatment, an inorganic compound such as polyaluminum chloride may be added to the dispersion liquid. Preferred examples of the inorganic compound include polyaluminum chloride, aluminum sulfate, highly basic polyaluminum chloride (BAC), polyaluminum hydroxide, and aluminum chloride. Among these, polyaluminum chloride, aluminum sulfate and the like are preferred. The release agent dispersion liquid is used in an emulsion aggregation method, but also when the toner is produced by a suspension polymerization method, the release agent dispersion liquid may be used.

By the dispersion treatment, a release agent dispersion liquid containing a release agent particle having a volume average particle diameter of 1 μm or less is obtained. The volume average particle diameter of the release agent particle is more preferably 100 nm to 500 nm.

If the volume average particle diameter is less than 100 nm, it is generally difficult for the release agent component to be incorporated into the toner, though this may be also affected by the characteristics of the binder resin used. On the other hand, if the volume average particle diameter exceeds 500 nm, the dispersion state of the release agent in the toner becomes insufficient in some cases.

For the preparation of a coloring agent dispersion liquid, a known dispersion method may be utilized, and, for example, a rotary shear-type homogenizer or a general dispersion unit such as media-containing ball mill, sand mill, Dynomill and Altimizer, may be employed, but the dispersion method is not limited thereto. The coloring agent is dispersed in water together with an ionic surfactant or a polymer electrolyte such as polymer acid and polymer base. The volume average particle diameter of the coloring agent particles dispersed may be sufficient if it is 1 μm or less, but when the volume average particle diameter is from 80 nm to 500 nm, good dispersion of the coloring agent in the toner is advantageously obtained without impairing the aggregating propensity.

—Aggregation Step—

In the aggregation step, a resin particle dispersion liquid, a coloring agent dispersion liquid, a release agent dispersion liquid, and the like are mixed to make a mixed solution, and the mixed solution is heated at a temperature not more than the glass transition temperature of the resin particle to cause aggregation and thereby form an aggregated particle. Formation of an aggregated particle is often performed by adjusting the mixed solution to an acidic pH under stirring. The pH is preferably from 2 to 7, and at this time, it is also effective to use an aggregating agent.

Incidentally, in the aggregation step, the release agent dispersion liquid may be added and mixed at a time together with various dispersion liquids such as resin particle dispersion liquid, or may be added in parts a plurality of times.

As the aggregating agent, a surfactant having reverse polarity to that of the surfactant used as the dispersant, that is, an inorganic metal salt or a divalent or higher valent metal complex, is suitably used. Above all, when a metal complex is used, the amount of the surfactant used can be reduced, and the charging characteristics are advantageously enhanced.

The inorganic metal salt is, in particular, preferably an aluminum salt or a polymer thereof. For obtaining a narrower particle size distribution, the valence of the inorganic metal salt is more preferably divalent than monovalent, trivalent than divalent, or tetravalent than trivalent, and with the same valence, a polymerization-type inorganic metal salt polymer is more suitable.

Also, a toner having a configuration where the surface of a core aggregated particle is coated with a resin, may be produced by additionally adding the resin particle dispersion liquid when the aggregated particle reaches a desired particle diameter (coating step). In this case, the release agent or coloring agent is hardly exposed to the toner surface, and the configuration above is preferred in view of electrostatic properties or developability. In the case of additionally adding the resin particle dispersion liquid, before the additional addition, an aggregating agent may be added or the pH may be adjusted.

—Fusing Step—

In the fusing step, the progress of aggregation is stopped by raising the pH of the suspension of aggregated particles to a range of 3 to 9 under the stirring condition in accordance with the aggregation step, and aggregated particles are fused by performing heating at a temperature not less than the glass transition temperature of the resin. In addition, when a core aggregated particle is coated with a resin, the resins are also fused to cover core aggregated particles. The heating time may be sufficient if it is long enough to effect fusing, and the heating may be performed for approximately from 0.5 hours to 10 hours.

After the fusing, the system is cooled to obtain fused particles. Also, in the cooling step, so-called slow cooling of lowering the cooling rate at near the glass transition temperature of the resin (in the range of glass transition temperature±10° C.), may be performed to accelerate crystallization.

The fused particle obtained by fusing becomes a toner particle through a solid-liquid separation step such as filtration, and, if desired, further through a washing step and a drying step. In the case of not externally adding an external additive to the toner particle, the obtained toner particle may be used as a toner.

—External Addition Step—

Similarly to the case of kneading-pulverization method, the above-described inorganic powder may be externally added to the obtained toner particle. The method for externally adding an inorganic powder is also the same as in the case of kneading-pulverization method.

<Electrostatic Image Developer>

The electrostatic image developer (hereinafter, referred to as "developer") according to the present exemplary embodiment contains at least the toner according to the present exemplary embodiment.

The toner according to the present exemplary embodiment is directly used as a single component developer or used as a two-component developer. In the case of use as a two-component developer, the toner is used by mixing it with a carrier.

The carrier which can be used in the two-component developer is not particularly limited, and a known carrier may be used. Examples thereof include a magnetic metal such as iron oxide, nickel and cobalt, a magnetic oxide such as ferrite and magnetite, a resin-coated carrier having a resin coating layer on the surface of such a core material, and a magnetic dispersion carrier. The carrier may be also a resin dispersion carrier where an electrically conductive material or the like is dispersed in a matrix resin.

The mixing ratio (by mass) between the toner and the carrier in the two-component developer is preferably toner:carrier=approximately from 1:100 to 30:100, more preferably on the order of 3:100 to 20:100

<Image Forming Apparatus and Image Forming Method>

The image forming apparatus according to the present exemplary embodiment using the developer according to the present exemplary embodiment is described below.

The image forming apparatus according to the present exemplary embodiment includes a latent image holding member, a charging unit for charging the surface of the latent image holding member, an electrostatic latent image forming unit for forming an electrostatic latent image on the surface of the latent image holding member, a developing unit for housing the developer according to the present exemplary embodiment and developing the electrostatic latent image with the developer to form a toner image, a transfer unit for transferring the toner image onto a recording medium, and a fixing unit for fixing the toner image on the recording medium.

By using the image forming apparatus according to the present exemplary embodiment, the image forming method according to the present exemplary embodiment, including a charging step of charging the surface of a latent image holding member, an electrostatic latent image forming step of forming an electrostatic latent image on the surface of the latent image holding member, a developing step of developing the electrostatic latent image with the developer according to the present exemplary embodiment to form a toner image, a transfer step of transferring the toner image onto a recording medium, and a fixing step of fixing the toner image on the recording medium, is performed.

In the image forming apparatus, the portion containing the developing unit may be, for example, a cartridge structure (process cartridge) that is detachably attached to the main body of the image forming apparatus. The process cartridge is suitably the process cartridge according to the present exemplary embodiment, which includes a developing unit for housing the developer according to the present exemplary embodiment and developing an electrostatic latent image formed on the surface of a latent image holding member with the developer to form a toner image and is detachably attached to the image forming apparatus.

One example of the image forming apparatus according to the present exemplary embodiment is described below, but the present exemplary embodiment is not limited thereto. Here, main parts illustrated in the drawing are described below, and explanation of others is omitted.

Figure 2:
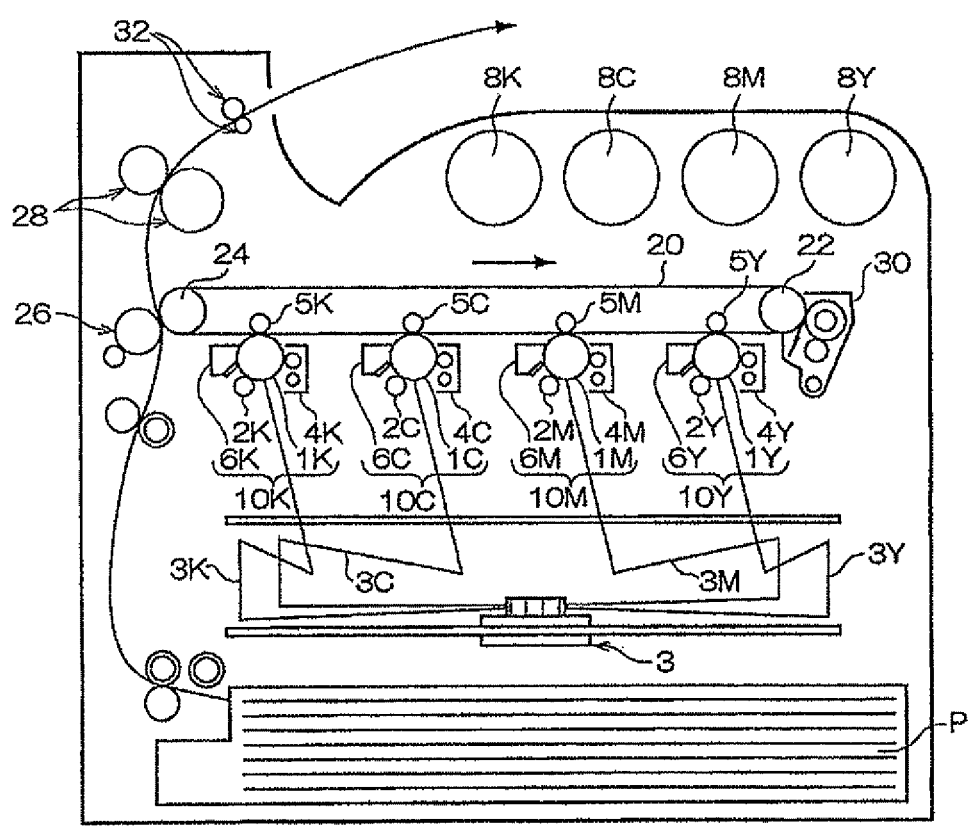
FIG. 2 is a schematic configuration view showing one example of the image forming apparatus according to the present exemplary embodiment.

FIG. 2 is a schematic view illustrating a quadruple tandem type color image forming apparatus. The image forming apparatus illustrated in FIG. 2 includes first, second, third and fourth image forming units 10Y, 10M, 10C and 10K of electrophotographic mode outputting yellow (Y), magenta (M), cyan (C) and black (K) color images based on color-separated image data. The image forming units (hereinafter, also referred to simply as "units") 10Y, 10M, 10C and 10K are arranged in parallel at predetermined intervals in a horizontal direction. The units 10Y, 10M, 10C and 10K may be process cartridges that can be detachably attached to a main body of the image forming apparatus.

As illustrated in FIG. 2, an intermediate transfer belt 20 as an intermediate transfer member is installed to run on top of the units 10Y, 10M, 10C and 10K. The intermediate transfer belt 20 is installed to wind a drive roller 22 and a support roller 24 in contact with the inner side thereof. The intermediate transfer belt 20 runs in a direction from the first unit 10Y toward the fourth unit 10K. The support roller 24 is pressed in a direction away from the drive roller 22 by a spring (now shown). A predetermined tension is given on the intermediate transfer belt 20 winding the two rollers. At a lateral surface of a latent image holding member of the intermediate transfer belt 20, an apparatus 30 for cleaning the intermediate transfer material is provided opposite the drive roller 22.

Developing apparatuses (or developing units) 4Y, 4M, 4C and 4K of the units 10Y, 10M, 10C and 10K can supply toners of four colors, i.e. yellow, magenta, cyan and black colors, accommodated in the toner cartridges 8Y, 8M, 8C and 8K, respectively.

Since the four units 10Y, 10M, 10C and 10K have the same constitution, the explanation of the first unit 10Y, which is arranged upstream the running direction of the intermediate transfer belt, can be applied to the other units. The units 10M, 10C and 10K include parts corresponding to the parts of the first unit 10Y and designated by letters M (magenta), C (cyan) and K (black) instead of Y (yellow), respectively, and their description is omitted.

The first unit 10Y has a photoconductor 1Y acting as a latent image holding member. A roller 2Y for electrically charging the surface of the photoconductor 1Y with a predetermined potential, an apparatus 3 for exposing the electrically charged surface to a laser beam 3Y based on color-separated image signals to form an electrostatic latent image, an apparatus (or a unit) 4Y for feeding an electrically charged toner to the electrostatic latent image to develop the electrostatic latent image, a primary transfer roller (or a primary transfer unit) 5Y for transferring the developed toner image to the intermediate transfer belt 20, and a cleaning apparatus (or a cleaning unit) 6Y for removing the toner remaining on the surface of the photoconductor 1Y after the primary transfer are arranged around the photoconductor 1Y.

The primary transfer roller 5Y is arranged at the inner side of the intermediate transfer belt 20 and is installed in a position opposite the photoconductor 1Y. A bias power supply (not shown) is connected and apply a primary transfer bias to each of the primary transfer rollers 5Y, 5M, 5C and 5K. The transfer bias applied to each of the primary transfer rollers from the bias power supply is varied by a control unit (not shown).

Hereinafter, an explanation will be given concerning the formation operation of a yellow image in the first unit 10Y. Prior to the operation, the surface of the photoconductor 1Y is electrically charged to about −600 V to about −800 V by the roller 2Y.

The photoconductor 1Y is formed by laminating a photosensitive layer on a conductive base having a volume resistivity of $1 \times 10^{-6}$ Ωcm or less at 20° C. Although the resistance of the photosensitive layer is usually high (comparable to that of general resins), the resistivity of a portion of the photosensitive layer irradiated with the laser beam 3Y tends to vary. Depending on yellow image data sent from a control unit (not shown), the exposure apparatus 3 outputs the laser beam 3Y to the surface of the electrically charged photoconductor 1Y. The laser beam 3Y is irradiated onto the surface of the photoconductor 1Y to form an electrostatic latent image in a yellow factor pattern on the surface of the photoconductor 1Y.

The electrostatic latent image refers to an image formed on the surface of the photoconductor 1Y by electrostatic charging. The electrostatic latent image is formed in the form of a so-called negative latent image because electrical charges flow on the surface of irradiated portions of the photoconductor 1Y due to the decreased resistivity of the irradiated portions but electrical charges remain on portions non-irradiated with the laser beam 3Y.

The electrostatic latent image formed on the photoconductor 1Y is rotated up to a predetermined development position according to the running motion of the photoconductor 1Y. At the development position, the electrostatic latent image on the photoconductor 1Y is visualized (developed) by the developing apparatus 4Y.

The yellow developer accommodated in the developing apparatus 4Y is friction-charged while agitating inside the developing apparatus 4Y, possesses the same polarity (negative polarity) as the counter charges charged on the photoconductor 1Y, and is maintained on a developer roll (or a developer holding member). When the surface of the photoconductor 1Y passes through the developing apparatus 4Y, the yellow toner is electrostatically attached to the antistatic latent image portions on the surface of the photoconductor 1Y. As a result, the latent image is developed with the yellow toner. The photoconductor 1Y, on which the yellow toner image is formed, runs continuously at a predetermined speed to allow the toner image developed on the photoconductor 1Y to be conveyed to a predetermined primary transfer position.

When the yellow toner image on the photoconductor 1Y is conveyed to the primary transfer position, a predetermined primary transfer bias is applied to the primary transfer roller 5Y to allow an electrostatic force directing toward the primary transfer roller 5Y from the photoconductor 1Y to act on the toner image. As a result, the toner image on the photoconductor 1Y is transferred to the intermediate transfer belt 20. The applied transfer bias has a polarity (+) opposite to the polarity (−) of the toner. In the first unit 10Y, for example, the applied transfer bias is controlled to about +10 μA by a control unit (not shown).

The toner remaining on the photoconductor 1Y is removed by the photoconductor cleaning apparatus 6Y and is then collected.

The primary transfer biases applied to the primary transfer rollers 5M, 5C, 5K are controlled in substantially the same manner as in the first unit.

The intermediate transfer belt 20, to which the yellow toner image is transferred, is sequentially conveyed from the first unit 10Y to the second, third and fourth units 10M, 10C and 10K. As a result of this sequential conveying, toner images of different colors overlap to form one overlapping toner image.

The intermediate transfer belt 20, where the four toner images overlap while passing through the first, second, third and fourth units, reaches a secondary transfer unit including the intermediate transfer belt 20, the support roller 24 in contact with the inner side of the intermediate transfer belt 20 and a secondary transfer roller (or a secondary transfer unit) 26 arranged on an image holding surface of the intermediate transfer belt 20. A recording paper (or a recording medium) P is fed at a predetermined timing into a gap between the secondary transfer roller 26 and the intermediate transfer belt 20, which are in contact with each other under pressure, through a feed mechanism and a predetermined secondary transfer bias is applied to the support roller 24. The applied transfer bias has the same polarity (−) as the polarity (−) of the toner and an electrostatic force directing toward the recording paper P from the intermediate transfer belt 20 acts on the overlapping toner image to allow the overlapping toner image on the intermediate transfer belt 20 to be transferred to the recording paper P. The secondary transfer bias is determined depending on the resistance of the secondary transferring unit, which is detected by a detecting unit (not shown), and the voltage thereof is controlled.

Thereafter, the recording paper P is sent to a fixing apparatus (or a fixing unit) 28. In the fixing apparatus, the overlapping toner image is heat-melted and fixed on the recording paper P. After the fixing of the color image is finished, the recording paper P is conveyed to the discharging unit by a convey roll (or a discharge roll) 32, completing the series of color image forming operations.

The image forming apparatus is constructed such that the overlapping toner image is transferred to the recording paper P through the intermediate transfer belt 20, but is not limited to this construction. For example, the image forming apparatus may have a construction that allows for direct transfer of the toner image from the photoconductor to the recording paper.

<Process Cartridge and Toner Cartridge>

Figure 3:
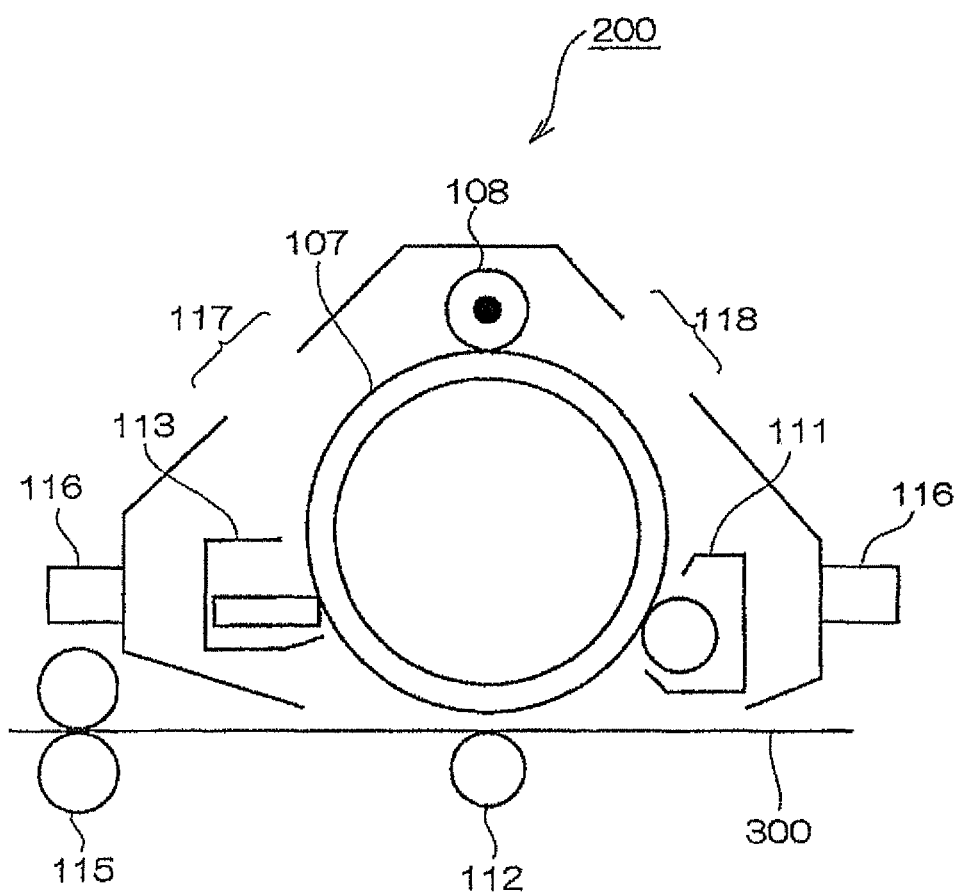
FIG. 3 is a schematic configuration view showing one example of the process cartridge according to the present exemplary embodiment, wherein 1Y, 1M, 1C, 1K and 107 denote Photoconductor (image holding member); 2Y, 2M, 2C and 2K denote Charging roller; 3Y, 3M, 3C and 3K denote Laser beam; 3: Exposure apparatus; 4Y, 4M, 4C, 4K and 111 denote Developing apparatus (developing unit); 5Y, 5M, 5C and 5K denote Primary transfer roller; 6Y, 6M, 6C, 6K and 113 denote Photoconductor cleaning apparatus (cleaning unit); 8Y, 8M, 8C and 8K denote Toner cartridge; 10Y, 10M, 10C and 10K denote Unit; 20 denotes Intermediate transfer belt; 22 denotes Drive roller; 24 denotes Support roller; 26 denotes Secondary transfer roller (transfer unit); 28 and 115: Fixing apparatus (fixing unit); 30 denotes Apparatus for cleaning the intermediate transfer material; 32 denotes Convey roll (discharge roll); 108 denotes Charging apparatus; 112 denotes Transfer apparatus; 116 denotes Mounting rail; 117 denotes Opening for antistatic exposure; 118 denotes Opening for exposure; 200 denotes Process Cartridge; P and 300 denote: Recording paper (recording medium).

FIG. 3 is a schematic view illustrating the constitution of a suitable example of a process cartridge accommodating the developer of the present exemplary embodiment. As illustrated in FIG. 3, the process cartridge 200 is a combination of a photoconductor 107, an electrically charging apparatus 108, a developing apparatus 111, a photoconductor cleaning apparatus (or a cleaning unit) 113, an opening for exposure 118 and an opening for antistatic exposure 117 on a rail 116, which are integrated into one cartridge.

The process cartridge 200 is freely attached detachably to a transfer apparatus 112, a fixing apparatus 115 and a main body of an image forming apparatus including other elements (not shown). The process cartridge 200 is combined with the main body to construct an image forming apparatus. Reference numeral 300 indicates a recording paper.

The photoconductor 107, the electrically charging roller 108, the developing apparatus 111, the photoconductor cleaning apparatus 113, the opening for exposure 118 and the opening for antistatic exposure 117 included in the process cartridge 200 illustrated in FIG. 3 may be selectively combined. For example, the process cartridge of the present exemplary embodiment may include the developing apparatus 111 and at least one element selected from the group consisting of the photoconductor 107, the electrically charging roller 108, the developing apparatus 111, the photoconductor cleaning apparatus (cleaning unit) 113, the opening for exposure 118 and the opening for antistatic exposure 117.

Next, an explanation will be given concerning a toner cartridge.

The toner cartridge is attached detachably to the image forming apparatus and at least accommodates a toner that is fed into the developing unit installed in the image forming apparatus. The toner is the toner of the present exemplary embodiment explained already. The construction of the toner cartridge is not limited so long as the toner is accommodated in the toner cartridge. A developer may be accommodated in the toner cartridge depending on the mechanism of the image forming apparatus.

The image forming apparatus illustrated in FIG. 2 is constructed such that the toner cartridges 8Y, 8M, 8C and 8K are attached detachably. The developing apparatuses 4Y, 4M, 4C and 4K are connected to corresponding toner cartridges through developer feed paths (not shown) depending on the colors thereof. The toner cartridges can be exchanged with new ones when the developers accommodated in the toner cartridges are substantially used up.

The present exemplary embodiments will be explained in detail with reference to the following examples but are not limited thereto. In the examples, unless otherwise indicated, all parts and percentages are by mass.

Method for Measurement of Various Physical Properties

<Measurement of Softening Temperature Measurement>

A sample (1 cm$^3$) is melt and is allowed to flow out using a flow tester (CFT-500, manufactured by Shimadzu Corporation) under the following conditions: dice pore diameter=0.5 mm, pressure load=0.98 MPa (10 Kg/cm$^2$), heating rate=1° C./min. A temperature corresponding to a half of the height between the starting temperature and the end temperature of the outflow is defined as the softening temperature.

<Measurement of Glass Transition Temperature>

The glass transition temperature is measured using DSC-20 (manufactured by SEICO Electronics industrial Co., Ltd.) while heating 10 mg of a sample at a constant rate of 10° C./min.

<Measurement of Acid Value>

The acid value is measured in accordance with JIS K0070 by using a neutralization titration method. That is, an appropriate amount of a sample is separated and after adding thereto 100 ml of a solvent (a mixed solution of diethyl ether/ethanol) and a few drops of an indicator (a phenolphthalein solution), the resultant mixture is sufficiently shaken in a water bath until the sample is completely dissolved. The obtained solution is titrated with a 0.1 mol/l ethanolic solution of potassium hydroxide, and the point at which the pale red color of the indicator continues for 30 seconds is designated as the endpoint. Assuming that the acid value is A, the amount of the sample is S (g), the amount of the ethanol solution of 0.1 mol/l potassium hydroxide used for the titration is B (ml), and f is the factor of the 0.1 mol/l ethanol solution of potassium hydroxide, the acid value is calculated as A=(B×f×5.611)/S.

<Measurement of Weight Average Molecular Weight Mw and Number Average Molecular Weight Mn>

The weight average molecular weight Mw and number average molecular weight Mn are measured using two lines of HLC-8120GPC and SC-8020 (manufactured by TOSOH Corporation, 6.0 mm ID×15 cm) using tetrahydrofuran (THF) as the eluting solvent and an RI detector under the following conditions: sample concentration=0.5%, flow rate=0.6 ml/min, sample injection amount=10 µl, temperature=40° C. Standard calibration curves are plotted using 10 polystyrene standard (TSK standard) samples A-500, F-1, F-10, F-80, F-380, A-2500, F-4, F-40, F-128 and F-700 (TOSOH Corporation).

SYNTHESIS EXAMPLE 1

—Synthesis of Specific Rosin Diol (Exemplary Compound No. 33)—

Into a stainless steel-made reaction vessel with a stirring device, a heating device, a cooling tube and a thermometer, 110 g of hydrogenated bisphenol A diglycidyl ether (Denacol EX252, trade name, produced by Nagase ChemteX Corporation) as a difunctional epoxy compound, 200 g of disproportionated rosin (Pinecrystal KR614, trade name, produced by Arakawa Chemical Industries, Ltd.) as a rosin, and tetraethylammonium bromide (produced by Tokyo Chemical Industry Co., Ltd.) as a reaction catalyst are charged. The temperature is raised to 130° C., and a ring-opening reaction of an acid group of the rosin and an epoxy group of the epoxy compound is performed. The reaction is continued at the same temperature for 4 hours and stopped when the acid value becomes 0.5 mgKOH/g, whereby Rosin Diol A is obtained.

—Synthesis of Rosin Resin 1—

Into a stainless steel-made reaction vessel with a stirring device, a heating device, a thermometer, a fractionating device and a nitrogen gas inlet tube, 150 g of terephthalic acid (TPA), 16 g of tetrapropenylsuccinic acid and 6 g of trimellitic anhydride as polyvalent carboxylic acid components, 650 g of Rosin Diol A and 70 g of bisphenol A propylene oxide adduct as polyhydric alcohol components, and 0.3 g of tetra-n-butyl titanate as a reaction catalyst are charged. A polycondensation reaction is allowed to proceed at 230° C. for 7 hours with stirring in a nitrogen atmosphere, and the molecular weight and the acid value are confirmed to have reached predetermined values, whereby Rosin Resin 1 (amorphous polyester resin) is synthesized.

SYNTHESIS EXAMPLE 2

—Synthesis of Specific Rosin Diol (Exemplary Compound No. 18)—

Into a stainless steel-made reaction vessel with a stirring device, a heating device, a cooling tube and a thermometer, 113 g of bisphenol A diglycidyl ether (jER828, trade name, produced by Mitsubishi Chemical Corporation) as a difunctional epoxy compound, 200 g of disproportionated rosin (Pinecrystal KR614, trade name, produced by Arakawa Chemical Industries, Ltd.) as a rosin, and tetraethylammonium bromide (produced by Tokyo Chemical Industry Co., Ltd.) as a reaction catalyst are charged. The temperature is raised to 130° C., and a ring-opening reaction of an acid group of the rosin and an epoxy group of the epoxy compound is performed. The reaction is continued at the same temperature for 4 hours and stopped when the acid value becomes 0.5 mgKOH/g, whereby Rosin Diol B is obtained.

—Synthesis of Rosin Resin 2—

Into a stainless steel-made reaction vessel with a stirring device, a heating device, a thermometer, a fractionating device and a nitrogen gas inlet tube, 150 g of isophthalic acid (IPA) and 80 g of tetrapropenylsuccinic acid as polyvalent carboxylic acid components, 315 g of Rosin Diol B and 265 g of bisphenol A propylene oxide adduct as polyhydric alcohol components, and 0.3 g of tetra-n-butyl titanate as a reaction catalyst are charged. A polycondensation reaction is allowed to proceed at 230° C. for 7 hours with stirring in a nitrogen atmosphere, and the molecular weight and the acid value are confirmed to have reached predetermined values, whereby Rosin Resin 2 (amorphous polyester resin) is synthesized.

SYNTHESIS EXAMPLE 3

—Synthesis of Rosin Resin 3—

Into a stainless steel-made reaction vessel with a stirring device, a heating device, a thermometer, a fractionating device and a nitrogen gas inlet tube, 130 g of isophthalic acid (IPA), 100 g of tetrapropenylsuccinic acid and 4 g of trimellitic anhydride as polyvalent carboxylic acid components, 315 g of Rosin Diol B and 265 g of bisphenol A propylene oxide adduct as polyhydric alcohol components, and 0.3 g of tetra-n-butyl titanate as a reaction catalyst are charged. A polycondensation reaction is allowed to proceed at 230° C. for 7 hours with stirring in a nitrogen atmosphere, and the molecular weight and the acid value are confirmed to have reached predetermined values, whereby Rosin Resin 3 (amorphous polyester resin) is synthesized.

SYNTHESIS EXAMPLE 4

—Synthesis of Rosin Resin 4—

Into a stainless steel-made reaction vessel with a stirring device, a heating device, a thermometer, a fractionating device and a nitrogen gas inlet tube, 140 g of isophthalic acid (IPA), 100 g of tetrapropenylsuccinic acid and 2.5 g of trimellitic anhydride as polyvalent carboxylic acid components, 315 g of Rosin Diol B and 265 g of bisphenol A propylene oxide adduct as polyhydric alcohol components, and 0.3 g of tetra-n-butyl titanate as a reaction catalyst are charged. A polycondensation reaction is allowed to proceed at 230° C. for 7 hours with stirring in a nitrogen atmosphere, and the molecular weight and the acid value are confirmed to have reached predetermined values, whereby Rosin Resin 4 (amorphous polyester resin) is synthesized.

SYNTHESIS EXAMPLE 5

—Synthesis of Rosin Resin 5—

Into a stainless steel-made reaction vessel with a stirring device, a heating device, a thermometer, a fractionating device and a nitrogen gas inlet tube, 140 g of isophthalic acid (IPA), 100 g of tetrapropenylsuccinic acid and 3.0 g of trimellitic anhydride as polyvalent carboxylic acid components, 315 g of Rosin Diol B and 265 g of bisphenol A propylene oxide adduct as polyhydric alcohol components, and 0.3 g of tetra-n-butyl titanate as a reaction catalyst are charged. A polycondensation reaction is allowed to proceed at 230° C. for 7 hours with stirring in a nitrogen atmosphere, and the molecular weight and the acid value are confirmed to have reached predetermined values, whereby Rosin Resin 5 (amorphous polyester resin) is synthesized.

SYNTHESIS EXAMPLE 6

—Synthesis of Specific Rosin Diol (Exemplary Compound No. 38)—

Into a stainless steel-made reaction vessel with a stirring device, a heating device, a cooling tube and a thermometer, 113 g of bisphenol A diglycidyl ether (jER828, trade name, produced by Mitsubishi Chemical Corporation) as a difunctional epoxy compound, 210 g of hydrogenated rosin (HYP-ALE CH, trade name, produced by Arakawa Chemical Industries, Ltd.) as a rosin, and tetraethylammonium bromide (produced by Tokyo Chemical Industry Co., Ltd.) as a reaction catalyst are charged. The temperature is raised to 130° C., and a ring-opening reaction of an acid group of the rosin and an epoxy group of the epoxy compound is performed. The reaction is continued at the same temperature for 4 hours and stopped when the acid value becomes 0.5 mgKOH/g, whereby Rosin Diol C is obtained.

—Synthesis of Rosin Resin 6—

Into a stainless steel-made reaction vessel with a stirring device, a heating device, a thermometer, a fractionating device and a nitrogen gas inlet tube, 150 g of terephthalic acid (TPA), 80 g of tetrapropenylsuccinic acid and 2.5 g of trimellitic anhydride as polyvalent carboxylic acid components, 455 g of Rosin Diol C and 190 g of bisphenol A propylene oxide adduct as polyhydric alcohol components, and 0.3 g of tetra-n-butyl titanate as a reaction catalyst are charged. A polycondensation reaction is allowed to proceed at 230° C. for 8 hours with stirring in a nitrogen atmosphere, and the molecular weight and the acid value are confirmed to have reached predetermined values, whereby Rosin Resin 6 (amorphous polyester resin) is synthesized.

SYNTHESIS EXAMPLE 7

—Synthesis of Specific Rosin Diol (Exemplary Compound No. 1)—

Into a stainless steel-made reaction vessel with a stirring device, a heating device, a cooling tube and a thermometer, 113 g of bisphenol A diglycidyl ether (jER828, trade name, produced by Mitsubishi Chemical Corporation) as a difunctional epoxy compound, 210 g of purified rosin (Pinecrystal KR65, trade name, produced by Arakawa Chemical Industries, Ltd.) as a rosin, and tetraethylammonium bromide (produced by Tokyo Chemical Industry Co., Ltd.) as a reaction catalyst are charged. The temperature is raised to 130° C., and a ring-opening reaction of an acid group of the rosin and an epoxy group of the epoxy compound is performed. The reaction is continued at the same temperature for 4 hours and stopped when the acid value becomes 0.5 mgKOH/g, whereby Rosin Diol D is obtained.

—Synthesis of Rosin Resin 7—

Into a stainless steel-made reaction vessel with a stirring device, a heating device, a thermometer, a fractionating device and a nitrogen gas inlet tube, 105 g of isophthalic acid (IPA), 40 g of terephthalic acid (TPA), 100 g of tetrapropenylsuccinic acid and 2.5 g of trimellitic anhydride as polyvalent carboxylic acid components, 360 g of Rosin Diol D and 240 g of bisphenol A propylene oxide adduct as polyhydric alcohol components, and 0.3 g of tetra-n-butyl titanate as a reaction catalyst are charged. A polycondensation reaction is allowed to proceed at 230° C. for 7 hours with stirring in a nitrogen atmosphere, and the molecular weight and the acid value are confirmed to have reached predetermined values, whereby Rosin Resin 7 (amorphous polyester resin) is synthesized.

SYNTHESIS EXAMPLE 8

—Synthesis of Specific Rosin Diol (Exemplary Compound No. 26)—

Into a stainless steel-made reaction vessel with a stirring device, a heating device, a cooling tube and a thermometer, 75 g of ethylene glycol diglycidyl ether (Denacol EX810, trade name, produced by Nagase ChemteX Corporation) as a difunctional epoxy compound, 200 g of purified rosin (KR- 85, trade name, produced by Arakawa Chemical Industries, Ltd.) as a rosin, and tetraethylammonium bromide (produced by Tokyo Chemical Industry Co., Ltd.) as a reaction catalyst are charged. The temperature is raised to 130° C., and a ring-opening reaction of an acid group of the rosin and an epoxy group of the epoxy compound is performed. The reaction is continued at the same temperature for 5 hours and stopped when the acid value becomes 0.5 mgKOH/g, whereby Rosin Diol F is obtained.

—Synthesis of Rosin Resin 8—

Into a stainless steel-made reaction vessel with a stirring device, a heating device, a thermometer, a fractionating device and a nitrogen gas inlet tube, 150 g of isophthalic acid (IPA), 35 g of tetrapropenylsuccinic acid and 4 g of trimellitic anhydride as polyvalent carboxylic acid components, 385 g of Rosin Diol F and 180 g of bisphenol A propylene oxide adduct as polyhydric alcohol components, and 0.3 g of tetra-n-butyl titanate as a reaction catalyst are charged. A polycondensation reaction is allowed to proceed at 230° C. for 9 hours with stirring in a nitrogen atmosphere, and the molecular weight and the acid value are confirmed to have reached predetermined values, whereby Rosin Resin 8 (amorphous polyester resin) is synthesized.

SYNTHESIS EXAMPLE 9

—Synthesis of Rosin Resin 9—

Into a stainless steel-made reaction vessel with a stirring device, a heating device, a thermometer, a fractionating device and a nitrogen gas inlet tube, 140 g of terephthalic acid (TPA), 16 g of tetrapropenylsuccinic acid and 5.5 g of trimellitic anhydride as polyvalent carboxylic acid components, 650 g of Rosin Diol A and 70 g of bisphenol A propylene oxide adduct as polyhydric alcohol components, and 0.3 g of tetra-n-butyl titanate as a reaction catalyst are charged. A polycondensation reaction is allowed to proceed at 230° C. for 6 hours with stirring in a nitrogen atmosphere, and the molecular weight and the acid value are confirmed to have reached predetermined values, whereby Rosin Resin 9 (amorphous polyester resin) is synthesized.

SYNTHESIS EXAMPLE 10

—Synthesis of Rosin Resin 10—

Into a stainless steel-made reaction vessel with a stirring device, a heating device, a thermometer, a fractionating device and a nitrogen gas inlet tube, 130 g of terephthalic acid (TPA), 20 g of tetrapropenylsuccinic acid and 9 g of trimellitic anhydride as polyvalent carboxylic acid components, 600 g of Rosin Diol A and 80 g of bisphenol A propylene oxide adduct as polyhydric alcohol components, and 0.3 g of tetra-n-butyl titanate as a reaction catalyst are charged. A polycondensation reaction is allowed to proceed at 230° C. for 6 hours with stirring in a nitrogen atmosphere, and the molecular weight and the acid value are confirmed to have reached predetermined values, whereby Rosin Resin 10 (amorphous polyester resin) is synthesized.

SYNTHESIS EXAMPLE 11

—Synthesis of Specific Rosin Diol—

Into a stainless steel-made reaction vessel with a stirring device, a heating device, a cooling tube and a thermometer, 113 g of bisphenol A diglycidyl ether (jER828, trade name, produced by Mitsubishi Chemical Corporation) as a difunctional epoxy compound, 200 g of gum rosin (Wuzhou, trade name, produced by Pine Chemicals Ltd.) as a rosin, and tetraethylammonium bromide (produced by Tokyo Chemical Industry Co., Ltd.) as a reaction catalyst are charged. The temperature is raised to 130° C., and a ring-opening reaction of an acid group of the rosin and an epoxy group of the epoxy compound is performed. The reaction is continued at the same temperature for 4 hours and stopped when the acid value becomes 0.5 mgKOH/g, whereby Rosin Diol G is obtained.

—Synthesis of Rosin Resin 11—

Into a stainless steel-made reaction vessel with a stirring device, a heating device, a thermometer, a fractionating device and a nitrogen gas inlet tube, 150 g of isophthalic acid (IPA) and 80 g of tetrapropenylsuccinic acid as polyvalent carboxylic acid components, 315 g of Rosin Diol B and 265 g of bisphenol A propylene oxide adduct as polyhydric alcohol components, and 0.3 g of tetra-n-butyl titanate as a reaction catalyst are charged. A polycondensation reaction is allowed to proceed at 230° C. for 7 hours with stirring in a nitrogen atmosphere, and the molecular weight and the acid value are confirmed to have reached predetermined values, whereby Rosin Resin 11 (amorphous polyester resin) is synthesized.

SYNTHESIS EXAMPLE 12

—Synthesis of General-Purpose Resin 1—

Into a glass-made reaction vessel with a stirring device, a heating device, a thermometer, a fractionating device and a nitrogen gas inlet tube, 150 g of terephthalic acid (TPA), 35 g of tetrapropenylsuccinic acid and 5.8 g of trimellitic anhydride as polyvalent carboxylic acid components, 345 g of bisphenol A ethylene oxide adduct as a polyhydric alcohol component, and 0.3 g of tetra-n-butyl titanate as a reaction catalyst are charged. A polycondensation reaction is allowed to proceed at 220° C. for 7 hours with stirring in a nitrogen atmosphere, and the molecular weight and the acid value are confirmed to have reached predetermined values, whereby General-Purpose Resin 1 (amorphous polyester resin) is synthesized.

SYNTHESIS EXAMPLE 13

—Synthesis of General-Purpose Resin 2—

Into a glass-made reaction vessel with a stirring device, a heating device, a thermometer, a fractionating device and a nitrogen gas inlet tube and 150 g of terephthalic acid (TPA), 35 g of tetrapropenylsuccinic acid as polyvalent carboxylic acid components, 350 g of bisphenol A ethylene oxide adduct as a polyhydric alcohol component, and 0.3 g of tetra-n-butyl titanate as a reaction catalyst are charged. A polycondensation reaction is allowed to proceed at 220° C. for 6 hours with stirring in a nitrogen atmosphere, and the molecular weight and the acid value are confirmed to have reached predetermined values, whereby General-Purpose Resin 2 (amorphous polyester resin) is synthesized.

SYNTHESIS EXAMPLE 14

—Synthesis of General-Purpose Resin 3—

Into a glass-made reaction vessel with a stirring device, a heating device, a thermometer, a fractionating device and a nitrogen gas inlet tube and 150 g of terephthalic acid (TPA), 25 g of tetrapropenylsuccinic acid as polyvalent carboxylic acid components, 60 g of propylene glycol and 60 g of hydrogenated bisphenol A as polyhydric alcohol components, and 0.3 g of tetra-n-butyl titanate as a reaction catalyst are charged. A polycondensation reaction is allowed to proceed at 220° C. for 6 hours with stirring in a nitrogen atmosphere, and the molecular weight and the acid value are confirmed to have reached predetermined values, whereby General-Purpose Resin 3 (amorphous polyester resin) is synthesized.

SYNTHESIS EXAMPLE 15

—Synthesis of Crystalline Resin 1—

Into a glass-made reaction vessel with a stirring device, a heating device, a thermometer, a fractionating device and a nitrogen gas inlet tube, 100 g of sebacic acid and 35 g of dodecanediol as polyvalent carboxylic acid components, and 0.2 g of tetra-n-butyl titanate as a reaction catalyst are charged. A polycondensation reaction is allowed to proceed at 230° C. for 8 hours with stirring in a nitrogen atmosphere, and the molecular weight and the acid value are confirmed to have reached predetermined values, whereby Crystalline Resin 1 (crystalline polyester resin) is synthesized.

[Production of Resin Particle Dispersion Liquid]
(Production of Rosin Resin Particle Dispersion Liquid 1)

100 Parts by mass of Rosin Resin 1 is charged into a reactor with a stirrer and dissolved and mixed at 120° C. for 30 minutes and thereafter, an aqueous solution for neutralization obtained by dissolving 1.0 parts by mass of sodium dodecylbenzenesulfonate and 1.0 parts by mass of an aqueous 1 N NaOH solution in 800 parts by mass of ion-exchanged water heated at 95° C. is charged into the flask. After emulsification for 5 minutes in a homogenizer (Ultra-turrax, manufactured by IKA), the flask is further shaken in an ultrasonic wave bath for 10 minutes and then cooled with room-temperature water, whereby Resin Particle Dispersion Liquid 1 having a median diameter of resin particles of 250 nm and a solid content of 20 mass % is obtained.

(Production of Rosin Resin Particle Dispersion Liquids 2 to 11)

Rosin Resin Particle Dispersion Liquids 2 to 11 are produced in the same manner as Rosin Resin Particle Dispersion Liquid 1 except for changing Rosin Resin 1 to Rosin Resins 2 to 11, respectively.

(Production of General-Purpose Resin Particle Dispersion Liquids 1 to 3 and Crystalline Resin Particle Dispersion Liquid 1)

General-Purpose Resin Particle Dispersion Liquids 1 to 3 and Crystalline Resin Particle Dispersion Liquid 1 are produced in the same manner as Rosin Resin Particle Dispersion Liquid 1 except for changing Rosin Resin 1 to General-Purpose Resins 1 to 3 and Crystalline Resin 1, respectively.

[Production of Developer]
(Production of Developer 1)
—Production of Coloring Agent Particle Dispersion Liquid 1—

| | |
|---|---|
| Cyan pigment (copper phthalocyanine, produced by Dainichiseika Color & Chemicals Mfg. Co., Ltd., C.I. Pigment Blue 15:3) | 50 parts by mass |
| Anionic surfactant (Neogen R, produced by Daiichi Kogyo Seiyaku Co., Ltd.) | 5 parts by mass |
| Ion-exchanged water | 200 parts by mass |

The components above are mixed and dissolved, and the resultant solution is dispersed in a homogenizer (Ultra-turrax, manufactured by IKA) for 5 minutes and in an ultrasonic wave bath for 10 minutes to obtain Cyan Coloring Agent Particle Dispersion Liquid 1 having a median diameter of 190 nm and a solid content of 21.5%.

—Production of Release Agent Particle Dispersion Liquid 1—

| | |
|---|---|
| Anionic surfactant (Neogen R, produced by Daiichi Kogyo Seiyaku Co., Ltd.) | 2 parts by mass |
| Ion-exchanged water | 800 parts by mass |
| Paraffin wax (HNP-9, produced by Nippon Seiro Co., Ltd.) | 200 parts by mass |

The components above are mixed, and the mixture is heated at 120° C. and subjected to a dispersion treatment in a pressure discharge-type Gaulin homogenizer to obtain a 20 mass % release agent dispersion liquid having a volume average particle diameter of 170 nm.

—Production of Toner—

| | |
|---|---|
| Rosin Resin Particle Dispersion Liquid 1 (high molecular weight resin particle dispersion liquid) | 100 parts by mass |
| Rosin Resin Particle Dispersion Liquid 2 (low molecular weight resin particle dispersion liquid) | 100 parts by mass |
| Coloring Agent Dispersion Liquid 1 | 62 parts by mass |
| Anionic surfactant (Dowfax 2A1, a 20% aqueous solution) | 15 parts by mass |
| Release Agent Dispersion Liquid 1 | 77 parts by mass |

Out of the raw materials above, Rosin Resin Particle Dispersion Liquid 1 as a high molecular weight resin particle dispersion liquid, Rosin Resin Particle Dispersion Liquid 2 as a low molecular weight resin particle dispersion liquid, the anionic surfactant and 250 parts by mass of ion-exchanged water are charged into a polymerization kettle with a pH meter, a stirring blade and a thermometer, and the surfactant is blended with the polyester resin particle liquids with stirring at 130 rpm for 15 minutes. After Coloring Agent Dispersion Liquid 1 and Release Agent Dispersion Liquid 1 are added thereto and mixed, an aqueous 0.3 M nitric acid solution is added to the resulting raw material mixture to adjust the pH to 4.8. Subsequently, 13 parts by mass of an aqueous 10% nitric acid solution of aluminum sulfate as an aggregating agent is added dropwise while applying a shear force at 3,000 rpm in Ultra-turrax and because the viscosity of the raw material mixture increases in the course of adding dropwise the aggregating agent, the dropping rate is slowed down so as to prevent the aggregating agent from deviating to one place when the viscosity is raised. After the completion of dropwise addition of the aggregating agent, stirring is further performed for 5 minutes by increasing the rotation speed to 5,000 rpm to sufficiently mix the aggregating agent and the raw material mixture, Furthermore, the raw material mixture is stirred at 500 rpm under heating at 25° C. by a mantle heater and after stirring for 10 minutes, formation of primary particle diameter is confirmed by using Coulter Multisizer II (manufactured by Coulter, aperture diameter: 50 μm). Thereafter, the temperature is raised to 43° C. at 0.1° C./min for growing an aggregated particle. Growth of an aggregated particle is confirmed as needed by using the Coulter Multisizer, and the aggregation temperature or the speed of rotation for stirring are changed depending on the aggregation rate.

On the other hand, for coating the aggregated particle, 118 parts by mass of ion-exchanged water and 8.2 parts by mass of an anionic surfactant (Dowfax 2A1, a 20% aqueous solution) are added to 85 parts by mass of Rosin Resin Particle Dispersion Liquid 1 as a high molecular weight resin particle dispersion liquid and 85 parts by mass of Rosin Resin Particle Dispersion Liquid 2 as a low molecular weight resin particle dispersion liquid and mixed, and the mixture is previously adjusted to a pH of 3.8 to prepare a resin particle dispersion liquid for coating. At the point of time when the aggregated particle grows to 5.2 μm in the aggregation step above, the previously prepared resin particle dispersion liquid for coating is added and held for 20 minutes under stirring. Thereafter, 1.5 pph of EDTA is added for stopping the growth of the coated aggregated particle and furthermore, an aqueous 1 M sodium hydroxide solution is added to control the pH of the raw material mixture to 7.6. Subsequently, for fusing the aggregated particles, the temperature is raised to 85° C. at a temperature rise rate of 1° C./min while adjusting the pH to 7.6. After reaching 85° C., the pH is adjusted to 7.6 or less so as to promote fusing and after confirming the fusing of aggregated particles by an optical microscope, the system is rapidly cooled at a temperature drop rate of 10° C./min by injecting ice water so as to stop the growth of the particle diameter.

Following that, for the purpose of washing the obtained particles, the particles are once sieved through a 15 μm mesh, and thereafter, ion-exchanged water (30° C.) in an amount of about ten times the solid content is added thereto. After stirring for 20 minutes, the resultant slurry is filtered once, and the solid content remaining on the filter paper is dispersed in the slurry. The particles are repeatedly washed four times with ion-exchanged water at 30° C. and then dried to obtain Toner Particle 1 having a volume average particle diameter of 5.8 μm. The volume average particle size distribution index GSDv of Toner 1 (Toner Particle 1) is 1.22, and the shape factor SF1 of the tone particle determined by shape observation in Luzex is 126.

—Production of Developer—

Developer 1 is produced as follows by using Toner 1 obtained.

1.5 Parts by mass of hydrophobic silica (TS720, produced by Cabot Corp) is added to 50 parts by mass of the toner, and these are mixed by a Sample mill to obtain Externally Added Toner 1.

Furthermore, a ferrite carrier having an average particle diameter of 35 μM coated with 1 mass % of polymethyl methacrylate resin (Mw: 80,000, produced by Soken Chemical & Engineering Co., Ltd.) is used as the carrier and after weighing this carrier and Externally Added Toner 1 to give a toner concentration of 5 mass %, both are stirred/mixed in a boll mill for 5 minutes to produce Developer 1.

(Developers 2 to 16)

Developers 2 to 16 are produced in the same manner as Developer 1 except that the resin particle dispersion liquids of the resin types according to Table 1 are used in place of the high molecular weight resin particle dispersion liquid and the low molecular weight resin particle dispersion liquid and the mass ratio of two resins is changed.

Details of each developer are shown in Tables 1 and 2.

TABLE 1

|  | Developer 1 (Example) | Developer 2 (Example) | Developer 3 (Example) | Developer 4 (Example) | Developer 5 (Comparative Example) |
|---|---|---|---|---|---|
| High molecular weight resin | Rosin Resin 1 | General-Purpose Resin 1 | Rosin Resin 3 | Rosin Resin 4 | Rosin Resin 1 |
| Low molecular weight resin | Rosin Resin 2 | Rosin Resin 2 | General-Purpose Resin 2 | Rosin Resin 2 | Crystalline Resin 1 |
| Mass ratio of high/low molecular weight resins | 50/50 | 50/50 | 50/50 | 70/30 | 50/50 |
| Mw1 of high molecular weight resin | 80000 | 90000 | 115000 | 65000 | 80000 |
| Mw2 of low molecular weight resin | 25000 | 25000 | 18000 | 25000 | 25000 |
| Mw1 − Mw2 | 55000 | 65000 | 97000 | 40000 | 55000 |
| Softening temperature of high molecular weight resin [° C.] | 121 | 122 | 125 | 118 | 120 |
| Softening temperature of low molecular weight resin [° C.] | 111 | 111 | 112 | 111 | 72 |

|  | Developer 6 (Example) | Developer 7 (Example) | Developer 8 (Example) | Developer 9 (Example) | Developer 10 (Example) |
|---|---|---|---|---|---|
| High molecular weight resin | Rosin Resin 5 | Rosin Resin 5 | Rosin Resin 7 | Rosin Resin 8 | Rosin Resin 9 |
| Low molecular weight resin | General-Purpose Resin 3 | Rosin Resin 6 | General-Purpose Resin 2 | General-Purpose Resin 2 | Rosin Resin 2 |
| Mass ratio of high/low molecular weight resins | 50/50 | 50/50 | 50/50 | 50/50 | 30/70 |
| Mw1 of high molecular weight resin | 80000 | 80000 | 85000 | 100000 | 80000 |
| Mw2 of low molecular weight resin | 25000 | 30000 | 18000 | 18000 | 25000 |

TABLE 1-continued

|  | | | | | |
|---|---|---|---|---|---|
| Mw1 − Mw2 | 55000 | 50000 | 67000 | 82000 | 55000 |
| Softening temperature of high molecular weight resin [° C.] | 123 | 123 | 127 | 133 | 123 |
| Softening temperature of low molecular weight resin [° C.] | 111 | 112 | 112 | 112 | 111 |

TABLE 2

|  | Developer 11 (Comparative Example) | Developer 12 (Comparative Example) | Developer 13 (Comparative Example) | Developer 14 (Comparative Example) | Developer 15 (Example) | Developer 16 (Example) |
|---|---|---|---|---|---|---|
| High molecular weight resin | Rosin Resin 1 | General-Purpose Resin 1 | Rosin Resin 7 | Rosin Resin 10 | Rosin Resin 4 | Rosin Resin 3 |
| Low molecular weight resin | none | General-Purpose Resin 2 | Rosin Resin 4 | Rosin Resin 2 | Rosin Resin 2 | Rosin Resin 11 |
| Mass ratio of high/low molecular weight resins | 100/0 | 50/50 | 50/50 | 20/80 | 15/85 | 60/40 |
| Mw1 of high molecular weight resin | 80000 | 90000 | 85000 | 130000 | 65000 | 115000 |
| Mw2 of low molecular weight resin | — | 18000 | 60000 | 25000 | 25000 | 18000 |
| Mw1 − Mw2 | — | 72000 | 25000 | 105000 | 40000 | 97000 |
| Softening temperature of high molecular weight resin [° C.] | 121 | 122 | 127 | 141 | 118 | 125 |
| Softening temperature of low molecular weight resin [° C.] | — | 112 | 118 | 111 | 111 | 105 |

[Evaluation]

Each of the developers obtained is evaluated as follows. The results are shown in Table 3.

—Evaluation of Low-Temperature Fixing Property—

A solid image is formed on copy paper (J paper) produced by Fuji Xerox Co., Ltd. to have a toner amount of 0.9 mg/cm$^2$ by using each of the developers obtained, and the low-temperature fixing property is evaluated by fixing the image in a modified machine of Color Docutech-60 (manufactured by Fuji Xerox Co., Ltd.) with a nip width of 6.5 mm at a fixing speed of 220 mm/sec. In the evaluation, after producing a fixed image at each fixing temperature by changing the fixing device temperature from 100° C. to 200° C. in steps of 10° C., the degree of peeling of the image in the folded part produced by valley-folding the image surface of each fixed image obtained is observed, and the width of the paper exposed in the folded part resulting from peeling of the image is measured. The fixing temperature at which the width becomes 0.5 mm or less is defined as MFT (minimum fixing temperature, ° C.). The evaluation criteria are as follows.

—Evaluation Criteria—

AA: MFT is <120° C. or less, and low-temperature fixing property is exerted.

A: MFT is <135° C. or less, and the low-temperature fixing property is slightly poor.

B: MFT is <150° C. or less, and the low-temperature fixing property is poor.

C: MFT is >150° C. or more, and the toner does not have low-temperature fixing property.

—Evaluation of IH Fixing Property (Low-Pressure Fixing Property)—

A solid image is formed on copy paper (J paper) produced by Fuji Xerox Co., Ltd. to have a toner amount of 0.9 mg/cm$^2$ by using each of the developers obtained, and a fixed image is produced in a modified machine of Color Docutech-60 (manufactured by Fuji Xerox Co., Ltd.) using an IH fixing unit (an electromagnetic induction heating-type fixing unit) at a fixing temperature of 170° C. and a fixing speed of 160 mm/sec. Thereafter, the surface of the image is rubbed with waste cloth (wiping cloth), and the presence or absence of peeling of image or transfer of toner to the waste cloth is examined. Furthermore, the image is folded, and the presence or absence of generation of an image defect is evaluated. The evaluation criteria are as follows.

—Evaluation Criteria—

AA: An image defect is not observed.

A: An image defect to such an extent as slightly recognized is produced.

B: A distinct image defect is recognized in a halftone image.

C: A distinct image defect is produced in all images.

—Evaluation of Gloss Uniformity—

With respect to the image areas of the image (image at MFT (minimum fixing temperature, ° C.)) and the solid image produced in the evaluation of IH Fixing Property, the 60° gloss is measured at 24 points (points on a grid at vertical and horizontal intervals of 5 cm) of the solid image by using a glossimeter (BYK MicroTrigloss glossimeter (20+60+85°), manufactured by Gardener). The gloss uniformity (gloss unevenness) is evaluated by the difference in the glossiness at 24 points (maximum value−minimum value). The evaluation criteria are as follows.

—Evaluation Criteria—

AA: The difference in glossiness is less than 5%, and the standard deviation of the 24 points of gloss measurement is 2.5 or less.

A: The difference in glossiness is less than 5%.

B: The difference in glossiness is from 5% to less than 10%.

C: The difference in glossiness is 10% or more.

The evaluation results are shown in Table 3, that is, the evaluation of the image produced in the evaluation of low-temperature fixing property is shown as "Gloss uniformity 1" and the evaluation of the image produced in the evaluation of IH fixing property is shown as "Gloss uniformity 2".

As seen from the results above, in the case of developers corresponding to Examples, good results are obtained in all of the low-temperature fixing property, the IH fixing property and the gloss uniformity compared with developers corresponding to Comparative Examples.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. An electrostatic image developing toner comprising:
(A) an amorphous polyester resin containing at least a repeating unit derived from a dicarboxylic acid component and a repeating unit derived from a dialcohol component represented by the following formula (1), and
(B) an amorphous polyester resin differing in the weight average molecular weight from the amorphous polyester resin (A), wherein the difference (absolute value) in the weight average molecular weight between the amorphous polyester resin (A) and the amorphous polyester resin (B) is from about 30,000 to about 100,000:

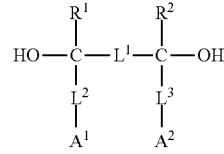

(1)

TABLE 3

|  | Developer 1 (Example) | Developer 2 (Example) | Developer 3 (Example) | Developer 4 (Example) | Developer 5 (Comparative Example) |
|---|---|---|---|---|---|
| Low-temperature fixing property | A | AA | AA | AA | C |
| Gloss uniformity 1 | AA | AA | AA | AA | A |
| IH Fixing property | AA | AA | AA | AA | C |
| Gloss uniformity 2 | A | A | A | AA | B |

|  | Developer 6 (Example) | Developer 7 (Example) | Developer 8 (Example) | Developer 9 (Example) | Developer 10 (Example) |
|---|---|---|---|---|---|
| Low-temperature fixing property | A | AA | AA | A | A |
| Gloss uniformity 1 | AA | AA | AA | AA | AA |
| IH Fixing property | AA | AA | AA | AA | B |
| Gloss uniformity 2 | B | AA | A | B | A |

|  | Developer 11 (Comparative Example) | Developer 12 (Comparative Example) | Developer 13 (Comparative Example) | Developer 14 (Comparative Example) | Developer 15 (Example) | Developer 16 (Example) |
|---|---|---|---|---|---|---|
| Low-temperature fixing property | C | B | B | C | B | A |
| Gloss uniformity 1 | B | B | B | A | A | AA |
| IH Fixing property | C | B | B | C | B | A |
| Gloss uniformity 2 | C | C | C | B | A | A | wherein each of $R^1$ and $R^2$ independently represents hydrogen or a methyl group, each of $L^1$, $L^2$ and $L^3$ independently represents a divalent linking group selected from the group consisting of a carbonyl group, an ester group, an ether group, a sulfonyl group, a chain alkylene group which may have a substituent, a cyclic alkylene group which may have a substituent, an arylene group which may have a substituent, and a combination thereof, $L^1$ and $L^2$, or $L^1$ and $L^3$ may form a ring, and each of $A^1$ and $A^2$ represents a rosin ester group.

2. The electrostatic image developing toner according to claim 1,
wherein the dialcohol component represented by formula (1) is a reaction product of a difunctional epoxy compound and a rosin.

3. The electrostatic image developing toner according to claim 2,
wherein the rosin is a purified rosin prepared through a purification treatment, a disproportionated rosin prepared through a disproportionation treatment, or a hydrogenated rosin prepared through a hydrogenation treatment.

4. The electrostatic image developing toner according to claim 1,
wherein at least either one of the amorphous polyester resin (A) and the amorphous polyester resin (B) is a polyester resin containing a repeating unit derived from a bisphenol A structure-containing component.

5. An electrostatic image developer containing the electrostatic image developing toner according to claim 1.

6. A toner cartridge accommodating the electrostatic charge image developing toner according to claim 1 and being detachably attached to an image forming apparatus.

7. A process cartridge containing a developing unit accommodating the electrostatic charge image developing toner according to claim 5 and developing an electrostatic latent image formed on the surface of a latent image holding member with the developer to form a toner image, and being detachably attached to an image forming apparatus.

8. An image forming apparatus comprising:
a latent image holding member,
a charging unit that charges the surface of the latent image holding member,
an electrostatic latent image forming unit that forms an electrostatic latent image on the surface of the latent image holding member,
a developing unit accommodating the electrostatic image developer according to claim 5 and developing the electrostatic latent image with the electrostatic image developer to form a toner image,
a transfer unit that transfers the toner image onto a recording medium, and
a fixing unit that fixes the toner image on the recording medium.

9. An image forming method comprising:
charging the surface of a latent image holding member,
forming an electrostatic latent image on the surface of the latent image holding member,
developing the electrostatic latent image with the electrostatic image developer according to claim 5 to form a toner image,
transferring the toner image onto a recording medium, and
fixing the toner image on the recording medium.

* * * * *